(12) United States Patent
Ikonin et al.

(10) Patent No.: US 11,375,187 B2
(45) Date of Patent: Jun. 28, 2022

(54) APPARATUS AND METHOD FOR FILTERING IN VIDEO CODING WITH LOOK-UP TABLE SELECTED BASED ON BITSTREAM INFORMATION

(71) Applicant: Huawei Technologies Co., Ltd., Shenzhen (CN)

(72) Inventors: Sergey Yurievich Ikonin, Moscow (RU); Victor Alexeevich Stepin, Moscow (RU); Alexander Alexandrovich Karabutov, Moscow (RU); Elena Alexandrovna Alshina, Munich (DE); Roman Igorevich Chernyak, Moscow (RU); Jianle Chen, San Diego, CA (US); Dmitry Yurievich Kuryshev, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/203,261

(22) Filed: Mar. 16, 2021

(65) Prior Publication Data

US 2021/0211657 A1 Jul. 8, 2021

Related U.S. Application Data

(63) Continuation of application No. PCT/RU2019/050144, filed on Sep. 10, 2019.
(Continued)

(30) Foreign Application Priority Data

Jul. 2, 2019 (WO) ................ PCT/RU2019/050100

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/184* (2014.11); *H04N 19/70* (2014.11); *H04N 19/82* (2014.11)

(58) Field of Classification Search
CPC ..... H04N 19/117; H04N 19/176; H04N 19/82
(Continued)

(56) References Cited

U.S. PATENT DOCUMENTS 5,402,244 A 3/1995 Kim
8,514,943 B2 8/2013 Lee et al.
(Continued)

FOREIGN PATENT DOCUMENTS

WO 2018117938 A1 6/2018

OTHER PUBLICATIONS

JVET-K0068-v3, Stepin, V., et al, "CE2 related: Hadamard Transform Domain Filter," Joint Video Experts Team (JVET) of ITU-T SG 16 WP 3 and ISO/IEC JTC 1/SC 29/WGII 11th Meeting: Ljubljana, SI, Jul. 10-18, 2018, 13 pages.
(Continued)

*Primary Examiner* — Amir Shahnami
(74) *Attorney, Agent, or Firm* — Conley Rose, P.C.

(57) ABSTRACT

A filter is configured for processing a reconstructed frame for generation of a filtered reconstructed frame, and wherein the reconstructed frame comprises a plurality of pixels. The filter includes one or more processor configured to scan a current pixel of the reconstructed block and its neighboring pixels of the current pixel according to a predefined scan template, obtain spectrum components by performing transform for the current pixel and its neighboring pixels, obtain filtered spectrum components based on a filtering parameter and the spectrum components, obtain filtered pixels by
(Continued)

performing inverse transform for the filtered spectrum components, and generate a filtered reconstructed block based on the filtered pixels.

23 Claims, 29 Drawing Sheets

Related U.S. Application Data

(60) Provisional application No. 62/793,866, filed on Jan. 17, 2019, provisional application No. 62/757,732, filed on Nov. 8, 2018, provisional application No. 62/735,722, filed on Sep. 24, 2018, provisional application No. 62/731,972, filed on Sep. 17, 2018, provisional application No. 62/731,967, filed on Sep. 16, 2018.

(51) Int. Cl.
*H04N 19/184* (2014.01)
*H04N 19/70* (2014.01)
*H04N 19/82* (2014.01)

(58) Field of Classification Search
USPC .................................................. 375/240.18
See application file for complete search history.

(56) References Cited

U.S. PATENT DOCUMENTS

| | | |
|---|---|---|
| 2006/0133683 A1 | 6/2006 | Srinivasan |
| 2013/0101063 A1* | 4/2013 | Jiang ..................... H04L 27/265 375/285 |
| 2013/0129241 A1* | 5/2013 | Wang ..................... H04N 19/19 382/233 |
| 2015/0281731 A1 | 10/2015 | Kadono et al. |
| 2016/0014425 A1 | 1/2016 | Hinz et al. |
| 2017/0155905 A1* | 6/2017 | Puri ........................ H04N 19/63 |

OTHER PUBLICATIONS

JVET-K0068, Victor Stepin et al, "JVET-K0068 CE2 related: Hadamard Transform Domain Filter," Aug. 2018, 8 pages.

* cited by examiner

| $I_{NW}$ | $I_A$ | $I_{NE}$ |
|---|---|---|
| $I_L$ | $I_C$ | $I_R$ |
| $I_{SW}$ | $I_B$ | $I_{SE}$ |

FIG. 18

APPARATUS AND METHOD FOR FILTERING IN VIDEO CODING WITH LOOK-UP TABLE SELECTED BASED ON BITSTREAM INFORMATION

CROSS-REFERENCE TO RELATED APPLICATIONS

This application is a continuation of International Patent Application No. PCT/RU2019/050144 filed on Sep. 10, 2019, which claims priority to U.S. Provisional Patent Application No. 62/731,967 filed on Sep. 16, 2018, U.S. Provisional Patent Application No. 62/731,972 filed on Sep. 17, 2018, U.S. Provisional Patent Application No. 62/735,722 filed on Sep. 24, 2018, U.S. Provisional Patent Application No. 62/757,732 filed on Nov. 8, 2018, U.S. Provisional Patent Application No. 62/793,866 filed on Jan. 17, 2019, and International Patent Application No. PCT/RU2019/050100 filed on Jul. 2, 2019. All of the aforementioned patent applications are hereby incorporated by reference in their entireties.

TECHNICAL FIELD

Generally, the present disclosure relates to the field of video coding. More specifically, the present disclosure relates to a filter for video coding, method for filtering reconstructed video frames, and method for filtering video blocks as well as an encoding apparatus and a decoding apparatus comprising such the filter for video coding.

BACKGROUND

Digital video has been widely used since the introduction of digital versatile discs (DVDs). Before transmission the video is encoded and transmitted using a transmission medium. The viewer receives the video and uses a viewing device to decode and display the video. Over the years the quality of video has improved, for example, because of higher resolutions, color depths and frame rates. This has led into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

As there is a continuous need for improving quality and reducing bandwidth requirements, solutions that maintain the quality with reduced bandwidth requirements or improve the quality while maintaining the bandwidth requirement are continuously searched. Furthermore, sometimes compromises may be acceptable. For example, it may be acceptable to increase the bandwidth requirements if the quality improvement is significant.

The High Efficiency Video Coding (HEVC) is an example of a video coding standard that is commonly known to persons skilled in the art. In HEVC, to split a coding unit (CU) into prediction units (PUs) or transform units (TUs). The Versatile Video Coding (VVC) next generation standard is the most recent joint video project of the International Telecommunication Union-Telecommunication Standardization Sector (ITU-T) Video Coding Experts Group (VCEG) and the International Standardization Organization (ISO)/International Electrotechnical Commission (IEC) Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, it removes the concepts of multiple partition types, i.e. it removes the separation of the CU, PU and TU concepts except as needed for CUs that have a size too large for the maximum transform length, and supports more flexibility for CU partition shapes.

Image filtering is frequently used to emphasize certain features of an image or to enhance the objective or perceptual quality of the filtered image. Image filtering has to deal with various sources of noise. Accordingly, various approaches for quality enhancement have been proposed and are currently in use. For example, in an adaptive loop filter (ALF) method, each reconstructed frame is divided into a set of small blocks (super-pixels) and each block is filtered by the ALF in that each pixel of the filtered reconstructed frame is a weighted sum of several pixels in the connected area of the pixel from the reconstructed frame around the position of the generating filtered pixel. Weighting coefficients (also referred to as filter coefficients) have property of central symmetry and are transmitted from the encoder to the decoder side. Edges often have a big size and therefore the number of transmitted weighting coefficients can become too large for an efficient processing. A large number of weighting coefficients requires a complex rate-distortion optimization (RDO) at the encoder side for decreasing the number of weighting coefficients for transmission. On the decoder side ALF requires implementation of universal multipliers and these multipliers should be reloaded for each 2×2 pixel block.

Thus, there is a need for an improved filter and method allowing to improve the prediction quality with low complexity and, thus, increase the video coding efficiency.

SUMMARY

It is an object of the disclosure to provide an improved filter and method allowing to improve the filtering efficiency with limited complexity and, thus, increase the video coding efficiency.

The foregoing and other objects are achieved by the subject matter of the independent claims. Further implementation forms are apparent from the dependent claims, the description and the figures.

According to a first aspect the disclosure relates to a method of coding implemented by an encoding device, comprising determining whether a transform domain filter (such as Hadamard transform domain filter) is enabled or not according to one or more conditions, and generating a bitstream including a syntax element (such as htdf_all_ctu_enabled_flag) (such as a syntax element (such as htdf_all_ctu_enabled_flag) indicating whether the transform domain filter (such as Hadamard transform domain filter) is enabled or not).

In a possible implementation form, the syntax element is signaled at least one of a sequence parameter set (SPS) level, a picture parameter set (PPS) level, a slice header, coding tree unit (CTU) syntax, or CU syntax.

In a possible implementation form, the bitstream further includes information for adjusting table selection process of the transform domain filtering of the current block (information applied to selection of a look-up-table (LUT) of the transform domain filtering of the current block), or wherein the bitstream further includes an index offset (such as a table index offset, e.g. htdf_ctu_lut_idx).

In a possible implementation form, an adjusted table index is derived based on a derived base index and the index offset signaled at the bitstream (such as, a sum of a derived base index and a table index adjustment variable (idxOffset)).

In a possible implementation form, if the syntax element is a first value (e.g. false or 0) indicating the transform domain filter (such as Hadamard transform domain filter) is disabled, an adjusted table index is derived based on a derived base index and the index offset signaled at the bitstream.

In a possible implementation form, the adjusted table index is used for LUT selection from a set of LUTs, or the adjusted table index is used for determining, from the set of LUTs, a LUT (or array) used for the transform domain filtering of the current block.

In a possible implementation form, the index offset is used for LUT selection from a set of LUTs, or the index offset is used for determining, from the set of LUTs, a LUT (or array) used for the transform domain filtering of the current block.

In a possible implementation form, in the case that the transform domain filter (such as Hadamard transform domain filter) is enabled, if one or more conditions (such as all following conditions) are met, a table index (such as qpIdx) is derived by clipping operation on a first shifted quantization parameter (QP) value, wherein the first shifted QP value is obtained based on the block QP value or slice (group of tiles) QP value), otherwise, a table index (such as qpIdx) is derived by clipping operation on a second shifted QP value, wherein the second shifted QP value is obtained based on the block QP value or slice (group of tiles) QP value).

In a possible implementation form, the one or more conditions (such as all following conditions) are as follows, a prediction mode of the block is intra, a width of the block is equal to a height of the block, and/or the min value of a width of the block and a height of the block is larger than or equal to 32.

In a possible implementation form, in the case that the transform domain filter (such as Hadamard transform domain filter) is disabled, an index of an LUT (such as qpIdx) is derived by clipping operation on an adjusted index, wherein the adjusted index is obtained based on a base index and an index offset (such as, a sum of a derived base index and a idxOffset).

In a possible implementation form, the base index is derived by clipping operation on a first or second shifted QP value, wherein the first or second shifted QP value is obtained based on the block QP value or slice (group of tiles) QP value.

In a possible implementation form, in the case that the transform domain filter (such as Hadamard transform domain filter) is disabled, if one or more conditions (such as all following conditions) are met, an index of an LUT (such as qpIdx) is derived by clipping operation on an adjusted index, wherein the adjusted index is obtained based on a first shifted QP value and an index offset (such as, a sum of a first shifted QP value and a idxOffset), wherein the first shifted QP value is obtained based on the block QP value or slice (group of tiles) QP value), otherwise, an index of an LUT (such as qpIdx) is derived by clipping operation on an adjusted index, wherein the adjusted index is obtained based on a second shifted QP value and an index offset (such as, a sum of a second shifted QP value and a idxOffset), wherein the second shifted QP value is obtained based on the block QP value or slice (group of tiles) QP value.

In a possible implementation form, the one or more conditions (such as all following conditions) are as follows, a prediction mode of the block is intra, a width of the block is equal to a height of the block, and/or the min value of a width of the block and a height of the block is larger than or equal to 32.

According to a second aspect the disclosure relates to a method of coding implemented by a decoding device, comprising parsing from a bitstream a syntax element (such as htdf_all_ctu_enabled_flag) (such as a syntax element (such as htdf_all_ctu_enabled_flag) indicating whether the transform domain filter (such as Hadamard transform domain filter) is enabled or not, and adaptively enabling or disabling a transform domain filtering of the current block according to the syntax element indicating whether the transform domain filter (such as Hadamard transform domain filter) is enabled or not.

In a possible implementation form, the syntax element is obtained from any one of a SPS level of a bitstream, a PPS level of the bitstream, a slice header, CTU syntax, or CU syntax.

In a possible implementation form, further comprising parsing from the bitstream information for adjusting table selection process of the transform domain filtering of the current block (information applied to selection of a LUT of the transform domain filtering of the current block), or an index offset (such as a table index offset, e.g. htdf_ctu_lut_idx).

In a possible implementation form, an adjusted table index is derived based on a derived base index and the index offset.

In a possible implementation form, if the syntax element is a first value (e.g. false or 0) indicating the transform domain filter (such as Hadamard transform domain filter) is disabled, an adjusted table index is derived based on a derived base index and the index offset (e.g. a sum of a derived base index and the index offset).

In a possible implementation form, the adjusted table index is used for LUT selection from a set of LUTs, or the adjusted table index is used for determining, from the set of LUTs, a LUT (or array) used for the transform domain filtering of the current block.

In a possible implementation form, the index offset is used for LUT selection from a set of LUTs, or the index offset is used for determining, from the set of LUTs, a LUT (or array) used for the transform domain filtering of the current block.

In a possible implementation form, in the case that a syntax element indicating the transform domain filter (such as Hadamard transform domain filter) is enabled or the syntax element is a second value (e.g. true or 1), if one or more conditions (such as all following conditions) are met, a table index (such as qpIdx) is derived by clipping operation on a first shifted QP value, wherein the first shifted QP value is obtained based on the block QP value or slice (group of tiles) QP value), otherwise, a table index (such as qpIdx) is derived by clipping operation on a second shifted QP value, wherein the second shifted QP value is obtained based on the block QP value or slice (group of tiles) QP value).

In a possible implementation form, the one or more conditions (such as all following conditions) are as follows, a prediction mode of the block is intra, a width of the block is equal to a height of the block, and/or the min value of a width of the block and a height of the block is larger than or equal to 32.

In a possible implementation form, in the case that a syntax element indicating the transform domain filter (such as Hadamard transform domain filter) is disabled or the syntax element is a first value (e.g. false or 0) an index of an LUT (a table index, such as qpIdx) is derived by clipping operation on an adjusted index, wherein the adjusted index is obtained based on a base index and an index offset (e.g. a sum of a base index and an index offset).

In a possible implementation form, the base index is derived by clipping operation on a first or second shifted QP value, wherein the first or second shifted QP value is obtained based on the block QP value or slice (group of tiles) QP value.

In a possible implementation form, in the case that a syntax element indicating the transform domain filter (such as Hadamard transform domain filter) is enabled or the syntax element is a first value (e.g. false or 0), if one or more conditions (such as all following conditions) are met, an index of an LUT (i.e. a table index, such as qpIdx) is derived by clipping operation on an adjusted index, wherein the adjusted index is obtained based on a first shifted QP value and an index offset (such as a sum of a first shifted QP value and an index offset), wherein the first shifted QP value is obtained based on the block QP value or slice (group of tiles) QP value), otherwise, an index of an LUT (such as qpIdx) is derived by clipping operation on an adjusted index, wherein the adjusted index is obtained based on a second shifted QP value and an index offset (such as a sum of a second shifted QP value and an index offset), wherein the second shifted QP value is obtained based on the block QP value or slice (group of tiles) QP value.

In a possible implementation form, the one or more conditions (such as all following conditions) are as follows, a prediction mode of the block is intra, a width of the block is equal to a height of the block, and/or the min value of a width of the block and a height of the block is larger than or equal to 32.

According to a third aspect the disclosure relates to a filter for video coding, wherein the filter is configured for processing a block for generation of a filtered block, wherein the block comprises a plurality of pixels. The filter includes a memory storage comprising instructions, and one or more processor in communication with the memory. The one or more processors executes the instructions to load a current pixel and its neighboring pixels to a linear buffer according to a predefined scan template, obtain spectrum components by performing one-dimensional (1D) transform for pixels in the linear buffer, obtain filtered spectrum components by multiplying each spectrum component with a gain coefficient, wherein the gain coefficient depends on a corresponding spectrum component and a filtering parameter, obtain filtered pixels by performing inverse 1D transform for filtered spectrum components, and generate the filtered block based on the filtered pixels.

As an example, the block (or frame) may be a predicted block, and the filtered block is a filtered predicted block. As another example, the block (or frame) may be a reconstructed block, and the filtered block is a filtered reconstructed block.

As an example, the gain coefficient is a function of the corresponding spectrum component and the filtering parameter. The filtering parameter may be derived from a codec QP.

An another example, a first spectrum component is bypassed without filtering when the gain coefficient G (i, σ) for the first spectrum component is equal to one. The first spectrum component corresponds to sum or average value of samples in the linear buffer, and the first spectrum component may correspond to direct current (DC).

As other example, wherein the one or more processors executes the instructions to drop N bits from table values of the LUT, N is an integer. N may be dependent on QP value, or is a fixed value.

As an example, the predefined scan template is defined as set of spatial or raster offsets relative to a position of the current pixel inside the reconstructed block. Offsets point to neighbor pixels are inside the reconstructed block. At least one filtered pixel may be placed to its original position according to the predefined scan template. When all filtered pixels are added to an accumulation buffer according to the predefined scan template, and the accumulation buffer could be initialized by zero before the obtaining filtered spectrum components. When final filtered pixels are obtained as accumulated values in the accumulation buffer divided by number of pixels adding to a current position of the accumulation buffer, one or more processor is configured to generate the filtered reconstructed block based on the final filtered pixels.

Optionally, differences between all filtered and corresponding unfiltered pixels are added to an accumulation buffer according to the predefined scan template, and the accumulation buffer could initialize by unfiltered pixels multiplied by maximum number of pixel values to be added in the block. The final filtered pixels are obtained as accumulated values in the accumulation buffer divided by maximum number of pixel values to be added in the block.

According to a fourth aspect the disclosure relates to a corresponding filtering method for processing a block for generation of a filtered block, wherein the block comprises a plurality of pixels. Each pixel is associated with a pixel value. The filtering method comprises the steps of loading a current pixel and its neighboring pixels to a linear buffer according to a predefined scan template, obtaining spectrum components by performing 1D transform for pixels in the linear buffer, obtaining filtered spectrum components by multiplying each spectrum component with a gain coefficient, wherein the gain coefficient depends on a corresponding spectrum component and a filtering parameter, obtaining filtered pixels by performing inverse 1D transform for filtered spectrum components, and generating the filtered block based on the filtered pixels.

As an example, the block (or frame) may be a predicted block, and the filtered block is a filtered predicted block. As another example, the block (or frame) may be a reconstructed block, and the filtered block is a filtered reconstructed block.

As an example, the gain coefficient is a function of the corresponding spectrum component and the filtering parameter. The filtering parameter may be derived from a codec QP.

An another example, a first spectrum component is bypassed without filtering when the gain coefficient G (i, σ) for the first spectrum component is equal to one. The first spectrum component may correspond to DC value.

As other example, filtering of the spectrum components based on a LUT. LUT generation may be based on an auxiliary function for at least some QPs. The auxiliary function may be a straight line equation coming over points (i,THR) and (a, 0), where a>0 and a depends on filtering parameter σ or QP value. For example, for the last QP in a set of QPs, a equals to 11, or for the second last QP in the set of QPs, a equals to 9.

As other example, the method further includes dropping N bits from table values of the LUT, N is an integer. N may be dependent on QP value, or is a fixed value. When N is selected less for lower QP in comparison to higher QP from the set of QPs, for example, for the first QP in the set of QPs, N is equal to 2, or for the rest QPs from the set of QPs, N is equal to 3. Alternatively, when N is selected higher for higher QP in comparison to lower QP from the set of QPs of QPs, for example, for the last QP or for the last two QPs in the set of QPs, N is equal to 4, or for the rest QPs from the set of QPs, N is equal to 3. Alternatively, when N is selected less for lower QP and higher for higher QP in comparison to the rest QP from the set of QPs, for example, for the first QP in the set of QPs, N is equal to 2, for the last QP or for the last two QPs in the set of QPs, N is equal to 4, or, for the rest QPs from the set of QPs, N is equal to 3.

As an example, the predefined scan template is defined as set of spatial or raster offsets relative to a position of the current pixel inside the reconstructed block. Offsets point to neighbor pixels are inside the reconstructed block. At least one filtered pixel may be placed to its original position according to the predefined scan template. When all filtered pixels are added to an accumulation buffer according to the predefined scan template, and the accumulation buffer could be initialized by zero before the obtaining filtered spectrum components. When final filtered pixels are obtained as accumulated values in the accumulation buffer divided by number of pixels adding to a current position of the accumulation buffer, one or more processor is configured to generate the filtered reconstructed block based on the final filtered pixels.

Optionally, differences between all filtered and corresponding unfiltered pixels are added to an accumulation buffer according to the predefined scan template, and the accumulation buffer could initialize by unfiltered pixels multiplied by maximum number of pixel values to be added in the block. The final filtered pixels are obtained as accumulated values in the accumulation buffer divided by maximum number of pixel values to be added in the block.

According to an aspect the disclosure relates to an encoding apparatus for encoding a current frame from an input video stream, wherein the encoding apparatus comprises a filter according to any one of preceding aspects of the disclosure.

According to another aspect the disclosure relates to a decoding apparatus for decoding a current frame from a received bitstream, wherein the decoding apparatus comprises a filter according to any one of preceding aspects of the disclosure.

According to another aspect the disclosure relates to a computer program comprising program code for performing the method according to any one of the preceding aspects when executed on a computer.

According to another aspect the disclosure relates to a decoder, comprising a memory storage comprising instructions, and one or more processors in communication with the memory, wherein the one or more processors execute the instructions to carry out the method according to any one of the preceding aspects.

According to another aspect the disclosure relates to an encoder, comprising a memory storage comprising instructions, and one or more processors in communication with the memory, wherein the one or more processors execute the instructions to carry out the method according to any one of the preceding aspects.

According to another aspect the disclosure relates to a non-transitory computer-readable medium carrying a program code which, when executed by a computer device, causes the computer device to perform the method of any one of the preceding aspects.

According to another aspect the disclosure relates to a decoder comprising processing circuitry for carrying out the decoding method of any one of the preceding aspects.

According to another aspect the disclosure relates to an encoder comprising processing circuitry for carrying out the encoding method of any one of the preceding aspects.

Thus, the filter is provided allowing improving the efficiency for video coding. More specifically, the improved filter according to embodiments of the disclosure estimates filter parameters from the frame itself without filter parameters signaling and, therefore, requires significantly less signaling than conventional filters, which signal weight coefficients for filtering in the image domain.

BRIEF DESCRIPTION OF THE DRAWINGS

Further embodiments of the disclosure will be described with respect to the following figures.

FIG. 18 illustrates central pixel and its eight neighbors.

In the various figures, identical reference signs will be used for identical or functionally equivalent features.

DETAILED DESCRIPTION OF EMBODIMENTS

In the following description, reference is made to the accompanying drawings, which form part of the disclosure, and in which are shown, by way of illustration, specific aspects in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
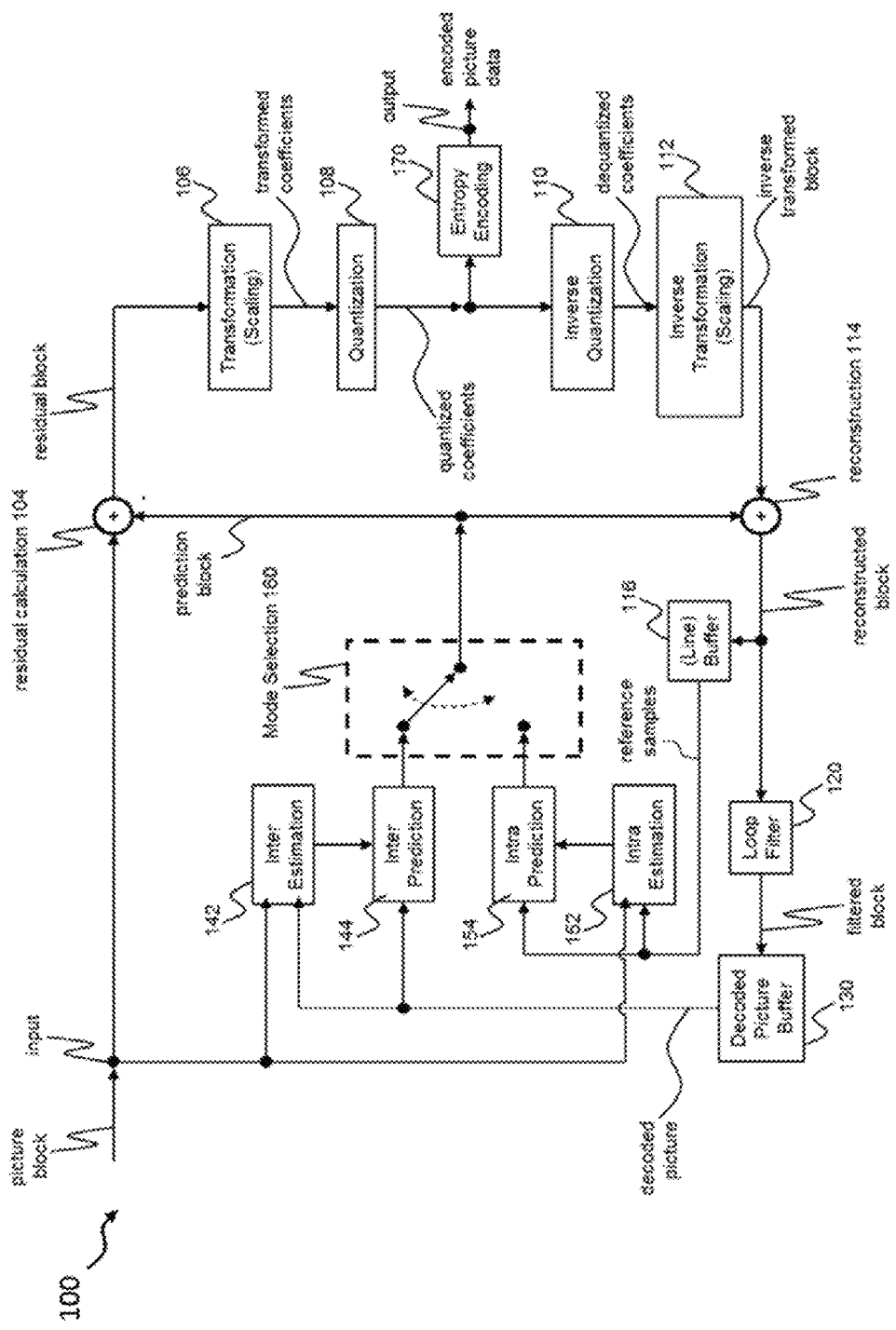
FIG. 1A shows a schematic diagram illustrating an encoding apparatus according to an embodiment comprising a filter according to an embodiment.

FIG. 1A shows an encoding apparatus 100 according to an embodiment comprising a filter 120 according to an embodiment. The encoding apparatus 100 is configured to encode a block of a frame of a video signal comprising a plurality of frames (also referred to as pictures or images herein), wherein each frame is dividable into a plurality of blocks and each block comprises a plurality of pixels. In an embodiment, the blocks could be macro blocks, CTUs, CUs, PUs and/or prediction blocks.

The term "block" in this disclosure is used for any type block or for any depth block, for example, the term "block" is included but not limited to root block, block, sub-block, leaf node, and etc. The blocks to be coded do not necessarily have the same size. One picture may include blocks of different sizes and the block rasters of different pictures of video sequence may also differ.

In the exemplary embodiment shown in FIG. 1A, the encoding apparatus 100 is implemented in the form of a hybrid video coding encoder. Usually, the first frame of a video signal is an intra frame, which is encoded using only intra prediction. To this end, the embodiment of the encoding apparatus 100 shown in FIG. 1A comprises an intra prediction unit 154 for intra prediction. An intra frame can be decoded without information from other frames. The intra prediction unit 154 can perform the intra prediction of a block on the basis of information provided by the intra estimation unit 152.

The blocks of subsequent frames following the first intra frame can be coded using inter or intra prediction, as selected by a mode selection unit 160. To this end, the encoding apparatus 100 shown in FIG. 1A further comprises an inter prediction unit 144. Generally, the inter prediction unit 144 can be configured to perform motion compensation of a block based on motion estimation provided by the inter estimation unit 142.

Figure 1B:
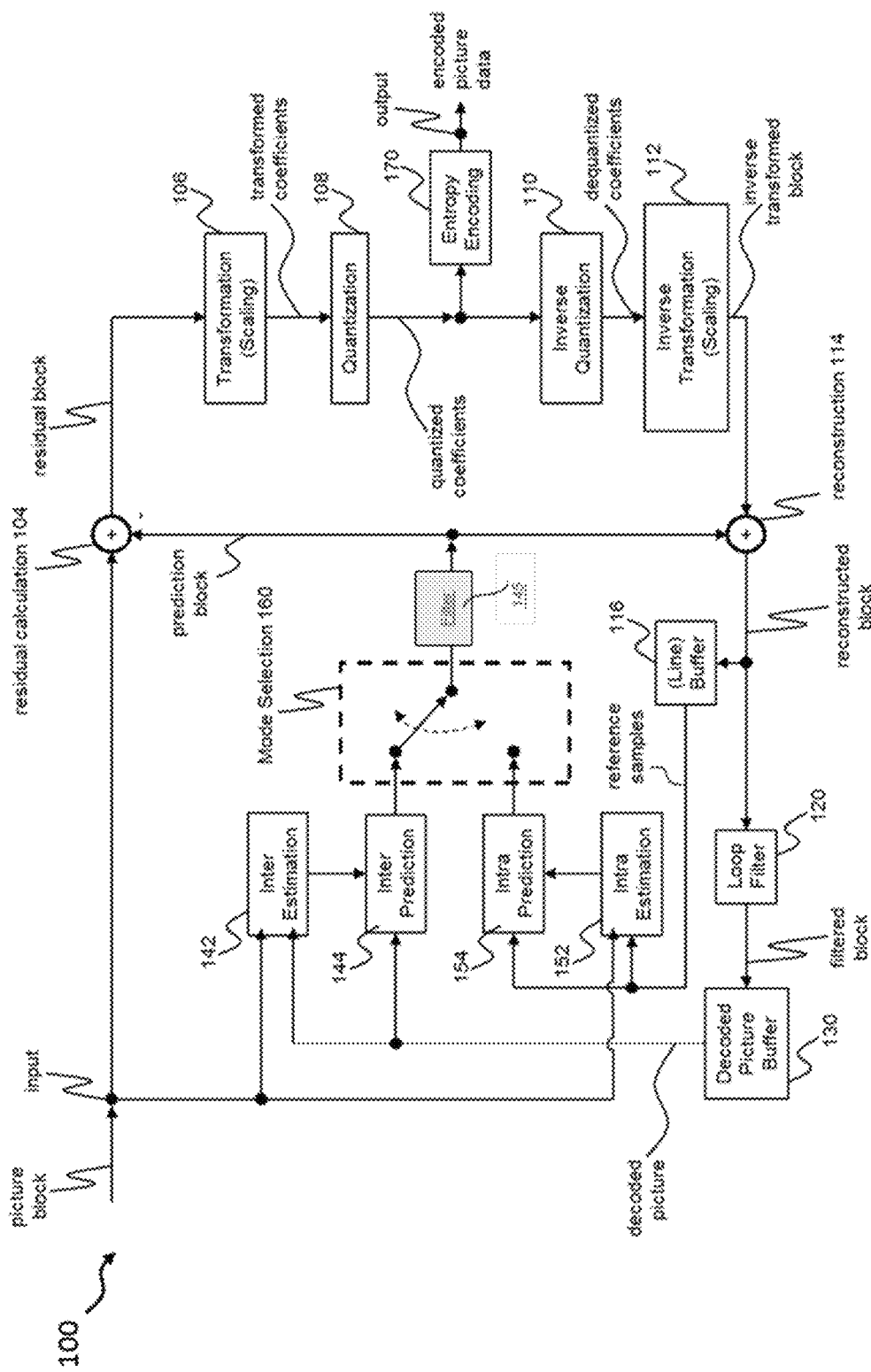
FIG. 1B shows a schematic diagram illustrating an encoding apparatus according to an embodiment comprising a filter according to an embodiment.

Furthermore, the prediction signal in the hybrid encoder embodiment shown in FIG. 1B obtain from intra or inter prediction is further filtered by filter 145.

Furthermore, in the hybrid encoder embodiment shown in FIG. 1A and FIG. 1B a residual calculation unit 104 determines the difference between the original block and its prediction, i.e. the residual block defining the prediction error of the intra/inter picture prediction. This residual block is transformed by the transformation unit 106 (for instance using a discrete cosine transform (DCT)) and the transformation coefficients are quantized by the quantization unit 108. The output of the quantization unit 108 as well as the coding or side information provided, for instance, by the intra prediction unit 154, the inter prediction unit 144 and the filter 120 are further encoded by an entropy encoding unit 170.

A hybrid video encoder usually duplicates the decoder processing such that both will generate the same predictions. Thus, in the embodiment shown in FIG. 1A and FIG. 1B the inverse quantization unit 110 and the inverse transformation unit perform the inverse operations of the transformation unit 106 and the quantization unit 108 and duplicate the decoded approximation of the residual block. The decoded residual block data is then added to the results of the prediction, i.e. the prediction block, by the reconstruction unit 114. Then, the output of the reconstruction unit 114 can be provided to a line buffer 116 to be used for intra prediction and is further processed by the filter 120, which will be described in more detail below. The final picture is stored in the decoded picture buffer 130 and can be used for the inter prediction of subsequent frames.

Figure 2A:
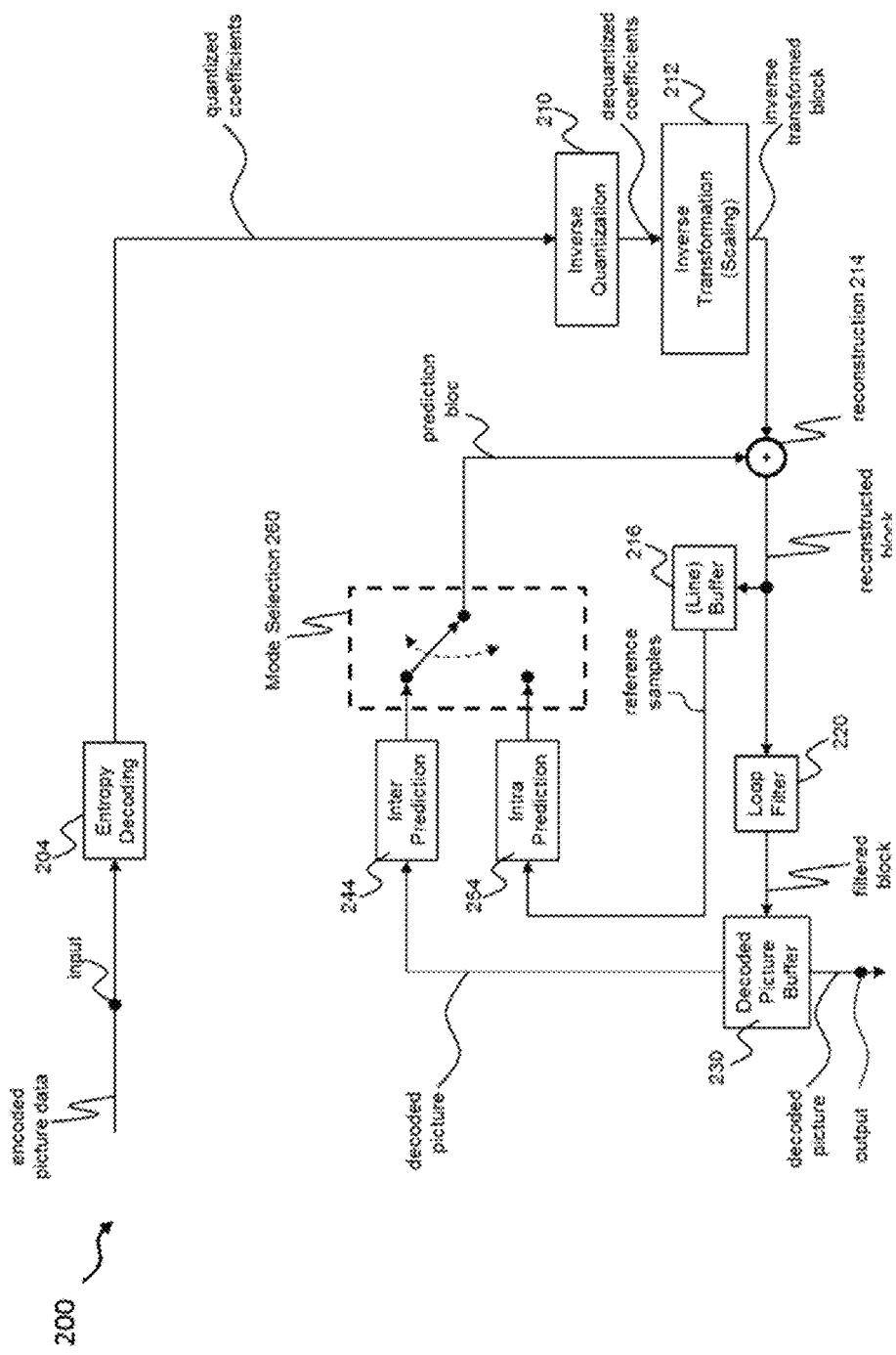
FIG. 2A shows a schematic diagram illustrating a decoding apparatus according to an embodiment comprising a filter according to an embodiment.

FIG. 2A shows a decoding apparatus 200 according to an embodiment comprising a filter 220 according to an embodiment. The decoding apparatus 200 is configured to decode a block of a frame of an encoded video signal. In the embodiment shown in FIG. 2A the decoding apparatus 200 is implemented as a hybrid decoder. An entropy decoding unit 204 performs entropy decoding of the encoded picture data, which generally can comprise prediction errors (i.e. residual blocks), motion data and other side information, which are needed, in particular, for an intra prediction unit 254 and an inter prediction unit 244 as well as other components of the decoding apparatus 200, such as the filter 220. Generally, the intra prediction unit 254 and the inter prediction unit 244 of the decoding apparatus 200 shown in FIG. 2A are selected by a mode selection unit 260 and function in the same way as the intra prediction unit 154 and the inter prediction unit 144 of the encoding apparatus 100 shown in FIG. 1A and FIG. 1B, so that identical predictions can be generated by the encoding apparatus 100 and the decoding apparatus 200. A reconstruction unit 214 of the decoding apparatus 200 is configured to reconstruct the block on the basis of the filtered predicted block and the residual block provided by the inverse quantization unit 210 and the inverse transformation unit 212. As in the case of the encoding apparatus 100, the reconstructed block can be provided to a line buffer 216 used for intra prediction and the filtered block/frame can be provided to a decoded picture buffer 230 by the filter 220 for inter prediction.

Figure 2B:
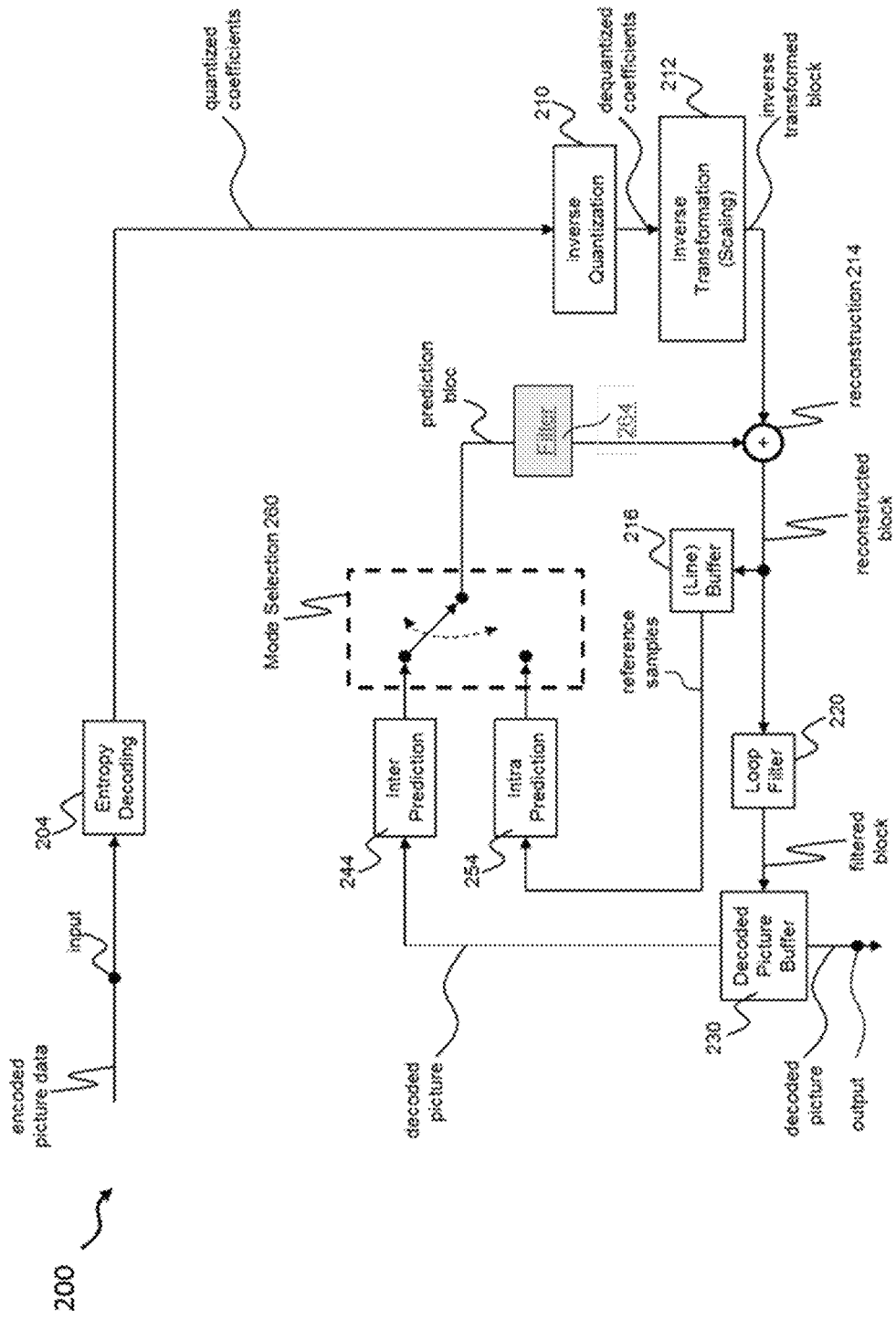
FIG. 2B shows a schematic diagram illustrating a decoding apparatus according to an embodiment comprising a filter according to an embodiment.

As shown in FIG. 2B, the prediction signal in the hybrid encoder embodiment shown in FIG. 2B obtain from intra or inter prediction is further filtered by filter 264.

As already described above, the filter 120, 220 may be used at a frame level, for example, the filter 120, 220 may be configured to process a reconstructed frame from a decoded reconstructed video stream for generating a filtered reconstructed frame, where the reconstructed frame includes a plurality of blocks. The filter 120, 220 may be also used at a block level immediately after block reconstruction without waiting for a whole frame, for example, the filter 120, 220 may be configured to process a reconstructed block for generating a filtered reconstructed block, where the reconstructed block includes a plurality of pixels.

The filter 120, 220, 145 or 264 comprises one or more processor (or one or more processing unit). As will be explained in more detail below, the one or more processor (or one or more processing unit) is configured to load a current pixel and its neighboring pixels to a linear buffer according to a predefined scan template (in other words, scan order, or scan pattern), obtain spectrum components by performing 1D transform for each pixel in the linear buffer, obtain filtered spectrum by multiplying each spectrum component with a gain coefficient, wherein the gain coefficient depends on a corresponding spectrum component and a filtering parameter, obtain filtered pixels by performing inverse 1D transform for filtered spectrum, and generate a filtered reconstructed block based on the filtered pixels estimated on previous processing steps. In an example, the gain coefficient depends on a corresponding spectrum component and a filtering parameter. In another example, the gain coefficient depends on one or more filtering parameters and one or more corresponding spectrum components. In other example, the respective gain coefficient may depend on one or more filtering parameters and the corresponding spectrum component as well as neighboring spectral components to the left and to the right of the spectrum component.

The disclosure describes in-loop filter for lossy video codec which performs local and/or non-local filtering of reconstructed block from reconstructed frame. According to an example, the reconstructed frame is divided into set of small non-overlapped rectangular blocks (CU blocks). On the next step each reconstructed block (reconstructed CU block) is filtered in frequency domain independently from other reconstructed blocks. The filter can also be applied after transform and reconstruction, and the filtered result is used both for output as well as for spatial and temporal prediction.

As another example, the disclosure describes prediction filter for lossy video codec which performs local and/or non-local filtering of prediction block of reconstructed frame.

At the first step of processing all pixels inside reconstructed block can be processed independently from each other. For processing of pixel r(0), neighboring pixels are used. For example, as illustrated on FIG. 3A, pixels r(1) to r(7) are used, and pixels r(0) to r(7) form one processing group.

Figure 3A:
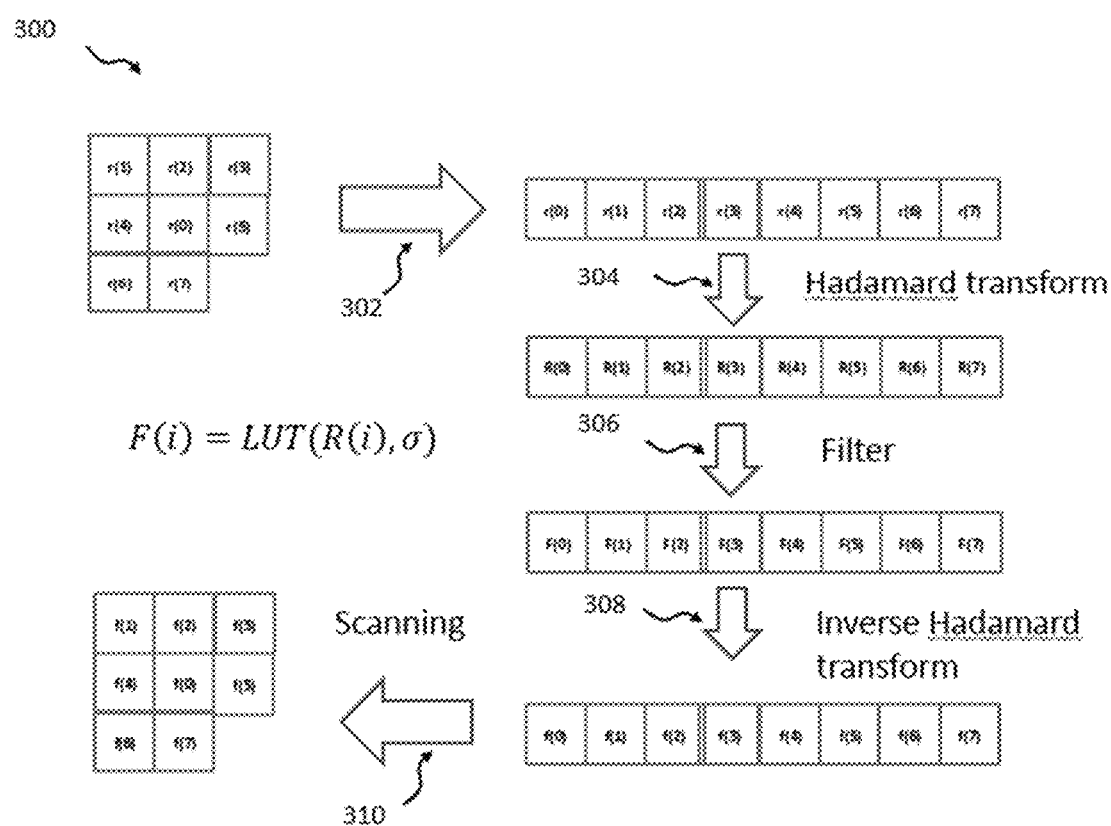
FIG. 3A shows a schematic diagram illustrating aspects of a filtering process implemented in a filter according to an embodiment.
Figure 3B:
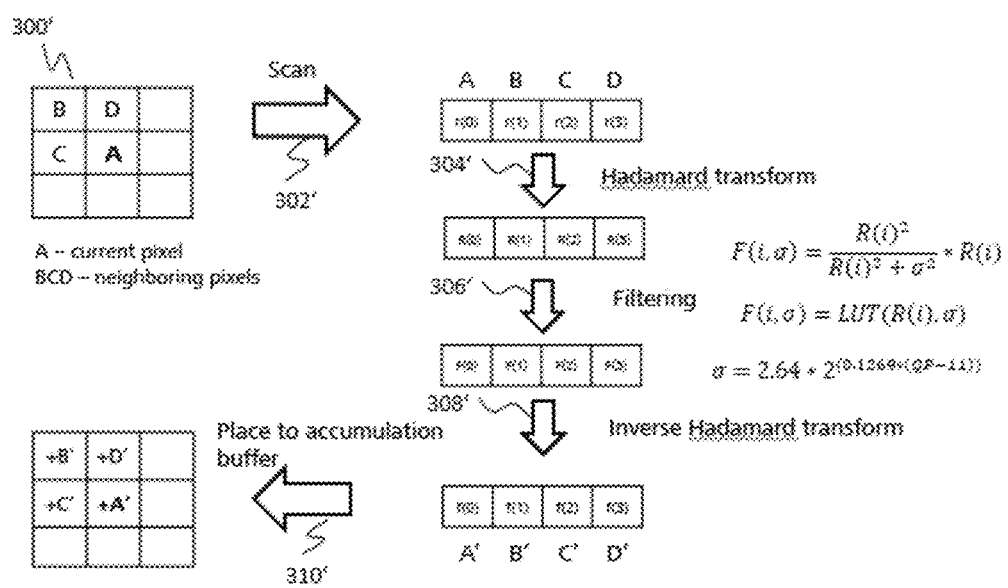
FIG. 3B shows a schematic diagram illustrating aspects of a filtering process implemented in a filter according to an embodiment.

FIG. 3A or FIG. 3B shows a schematic diagram 300, 300' illustrating aspects of a filtering process implemented in a filter according to an embodiment. At step 302, 302', a current pixel and its neighboring pixels from a block are loaded to a linear buffer according to a predefined scan template. As an example, the block may be a predicted block. As another example, the block may be a reconstructed block.

At step 304, 304', 1D transform is performed for pixel r(0) and its neighboring pixels r(1) to r(7) in the linear buffer to obtain spectrum components R:

$R = 1D\_Transform(r)$.

As an example, the 1D transform may be a Hadamard transform.

It should be understood that whether to perform 1D transform on 4 pixels in the raw (e.g. pixels A,B,C,D as in example on FIG. 3B) or perform 2D transform to spatially located pixels A,B,C,D relates to implementation specific. Applying 2D transform on 4 pixels A,B,C,D located in 2×2 block can lead to same result as applying 1D transform to 4 pixels A,B,C,D being taken as a raw. At step 306, 306', filtering is performed in frequency domain based on multiplication of each spectrum component R(i) by a corresponding gain coefficient G(i, σ) to obtain a filtered spectrum components F(i):

$$F(i) = R(i) * G(i, \sigma) \quad (1).$$

The set of gain coefficients for all spectrum components is frequency impulse response of the filter.

In an example, the gain coefficient depends on a corresponding spectrum component and a filtering parameter. In another example, the gain coefficient depends on one or more filtering parameters and one or more the corresponding spectrum components. In other example, the respective gain coefficient may depend on the one or more filtering parameters and the corresponding spectrum component as well as neighboring spectral components to the left and to the right of the spectrum component. If each gain coefficient is a function of spectrum component of the reconstructed block and the filtering parameter, or is a function spectrum component of the predicted block and the filtering parameter, gain coefficient G(i, σ) can be described by the following formula as an example:

$$G(i, \sigma) = \frac{R(i)^2}{R(i)^2 + m * \sigma^2} \quad (2)$$

where (i) is an index of a spectrum component, R(i) is the spectrum component corresponding to (i) index, G(i, σ) is the gain coefficient corresponding to R(i),σ is the filtering parameter, m is normalization constant equal to number of spectrum components. For example, m is 1, 2, 3, 4 . . . . Different spectrum components may have a same gain coefficient, or may have different gain coefficients.

For those transforms that have spectrum components corresponding to average (fast Fourier transform (FFT), DCT, discrete sine transform (DST) etc.) or sum (Hadamard) of input samples of the transform block (usually first component corresponding to DC value) it may be advantageous to have filtering coefficient equal to 1 to avoid changing of average luminance of the filtered block. That means bypassing (no filtering) for first spectrum component corresponding to DC value.

σ as the filtering parameter, may be deriving from codec QP on the encoder and decoder sides, for example, using the following formula:

$\sigma = k * 2^{(n*(QP-s))}$, wherein k, n and s are constants having values as example k=2.64, n=0.1296, s=11.

Different spectrum components may have a same filtering parameter, or may have different filtering parameters.

Parameters k, n and s can be selected in a such way to make sigma dependent on quantization step size that doubles each time the QP value increases by 6 in latest video coding standards. In example with parameters k=0.5, n=⅙ and s=0 the σ parameters is derived as follows:

$$\sigma = 0.5 * 2\left(\frac{QP}{6}\right).$$

Quantization scaling matrices are widely used to improve video compression quality. In this method quantization step size derived based on QP is multiplied by scaling factor transmitted in bitstream. For such method σ parameters derivation may be based on actual scaled quantization step size used for certain QP:

σ=k*Quantization_step_size(QP−s).

Constants k, n and s may have a fixed values for σ calculation, or may have different values depending on QP, block size and shape, type of prediction (inter/intra) for current block. For example for intra predicted square blocks with size 32×32 or more parameter s may be calculated as s=11+8=19. As equivalent filter parameter σ has smaller value that leads to softer filter which is more suitable for big square intra-predicted blocks usually corresponding to flat regions. As another example, k may be modified based on bit depth of pixels $k_{mod}$=k*(1<<(bit_depth−8))

According to the method 300, 300', gain coefficient for each frequency is derived from spectrum component of the reconstructed pixels or predicted pixels. Therefore, the method 300, 300' do not need transmission of filtering parameters and can be applied for any reconstructed block or predicted block without additional signaling.

The LUT details are discussed.

It can be noted that filtering implies multiplication of spectrum component R(i) on scaling coefficient which is always less than 1. It can also be observed that at high values of R(i) scaling coefficient is close to 1. Based on these observation spectrum filtering is implemented using an LUT that allows to exclude multiplications and division from filtering operations.

Spectrum gain coefficient is less 1, so filtering can be implemented based on short LUT reading according to the following formulas:

$$F(i, \sigma) = \begin{cases} R(i), & Abs(R(i)) \geq THR \\ LUT(R(i), \sigma), & R(i) > 0 \\ -LUT(-R(i), \sigma), & R(i) \leq 0 \end{cases}$$

where $$LUT(R(i), \sigma) = \frac{R(i)^3}{R(i)^2 + m*\sigma^2}.$$

(i) is an index of a spectrum component, R(i) is the spectrum component corresponding to (i) index, σ is the filtering parameter, and THR is a threshold, m is normalization constant equal to number of spectrum components. For example, m is 1, 2, 3, 4 . . . .

As an example, THR may be calculated from following formula, $$\frac{THR^2}{THR^2 + m*\sigma^2} = C$$

where C is a value close to 1, for example, 0.8 or 0.9. To reduce LUT size threshold THR may be dependent from QP value.

For further reducing LUT size second threshold may be introduced to replace small filtered values by zero. In that case the filtered spectrum component is F(i, σ) is further derived as:

$$F(i, \sigma) = \begin{cases} R(i), & Abs(R(i)) > THR \\ 0, & Abs(R(i)) < THR2 \\ LUT(R(i), \sigma), & R(i) > 0 \\ -LUT(-R(i), \sigma), & R(i) \leq 0 \end{cases}$$

where THR2 defines the threshold below that filtered spectrum component is considered to be zero. The second THR2 can also be defined depending on QP value.

After filtering in frequency domain, inverse 1D transform is performed for filtered spectrum component at step 308 to obtain filtered pixels f:

f=1D_Inverse_Transform(F).

At step 310, 310', the result of inverse 1D transform is placed to linear buffer of filtered reconstructed pixels or filtered pixels.

At step 312, 312' (not shown in FIG. 3A or FIG. 3B), a filtered block is generated based on the filtered pixels estimated on previous processing steps. As an example, the filtered block may be a filtered predicted block. As another example, the filtered block may be a filtered reconstructed block.

As shown in FIG. 3A as an embodiment, after filtering step 306, the filtered pixel f(0) is placed to its original position according to the predefined scan template. Other filtered samples f(1)-f(7) are not used. At another embodiment, more than one filtered pixels, for example, all filtered pixels from linear buffer of filtered samples are added to an accumulation buffer according to the predefined scan template used at step 302 of FIG. 3A. The accumulation buffer should be initialized by zero before the filtering step. At the last normalization step, final filtered pixels are obtained as accumulated values in the accumulation buffer divided by number of pixels added to a current position of the accumulation buffer, in other words, number of pixels values added to current position of accumulation buffer on previous processing steps. Then the filtered reconstructed block or the predicted block is generated based on the final filtered pixels.

As another embodiment, a filter has same implementation both for intra and inter CU filtering.

Hadamard transform domain filter is always applied to luma reconstructed blocks with non-zero transform coefficients, excluding 4×4 blocks and if slice QP is larger than 17. The filter parameters are explicitly derived from the coded information. Proposed filter, if applied, is performed on decoded samples right after block reconstruction. The filtered result is used both for output as well as for spatial and temporal prediction.

Figure 3C:
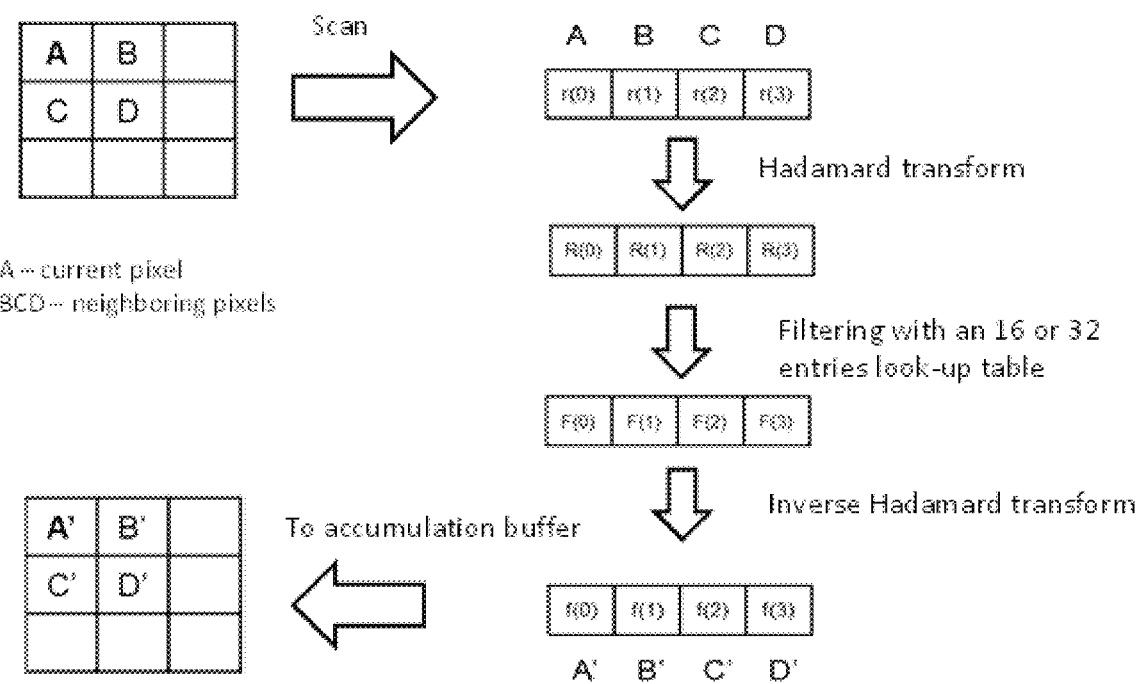
FIG. 3C shows a schematic diagram illustrating aspects of a filtering process implemented in a filter according to another embodiment.

The filtering process is discussed, as schematically presented on FIG. 3C.

For each pixel from reconstructed block pixel processing comprises the following steps.

Scan for 4 neighboring pixels around processing pixel including current one according to scan pattern.

4 point Hadamard transform of read pixels.

Spectrum filtering based on the formula (1) and (2).

The first spectrum component corresponding to DC value is bypassed without filtering.

Inverse 4 point Hadamard transform of filtered spectrum.

After filtering step the filtered pixels are placed to its original positions into accumulation buffer.

After completing filtering of pixels the accumulated values are normalized by number of processing groups used for each pixel filtering. Due to use of padding of one sample around the block number of processing groups is equal to 4 for each pixel in the block and normalization is performed by right shifting on 2 bits.

It can be seen that all pixels in the block can be processed independently in case of maximum parallelism is required.

In this embodiments, the threshold THR is set to a predefined value, for example, 128, that in case of straightforward implementation requires to store 128 (1<<7) entries of 7-bit values per each QP.

The size of LUT influences on amount of on-chip memory requirements and the cost of a hardware implementation of the filter. To reduce amount of on-chip storage the LUT if calculated only for limited set of QPs starting from QP 20 with constant interval of 8. Totally five pre-defined LUTs (for five QPs group) are stored. For filtering of current block CU's QP is rounded to closest one from the table.

For further reduction of LUT size the N lowest bits are dropped (or ignored) during LUT generation. That allows having sparse table representation.

For exemplary implementation A, N is equal to 2, that leads to 7−2=5 bits of table depth (32 entries of 7-bit values).

For exemplary implementation B, N is equal to 3, that leads to 7−3=4 bits of table depth (16 entries of 7-bit values).

Thus total memory size required for entire LUT storage.

For exemplary implementation A: 5×32×7 bits=1120 bits=140 bytes.

For exemplary implementation B: 5×16×7 bits=560 bits=70 bytes.

Exemplary implementation B is targeting to 16 bytes of LUT size to enable parallel access in software implementation due to ability to store entire LUT in one 16 bytes SSE register therefore this configuration is suggested.

If Hadamard transform is used, and a filtered pixel is placed to its original position according to the predefined scan template, then the following pseudo-code describes filtering process of method 300:

```
// reconstructed/predicted pixels scan
const int x0=pIn[p0];
const int x1=pIn[p1];
const int x2=pIn[p2];
const int x3=pIn[p3]; // p0-p3 define scan pattern
// 1D forward Hadamard transform
const int y0=x0+x2;
const int y1=x1+x3;
const int y2=x0-x2;
const int y3=x1-x3;
const int t0=y0+y1;
const int t1=y0-y1;
const int t2=y2+y3;
const int t3=y2-y3;
// frequency domain filtering
const int z0=pTb1[t0];
const int z1=pTb1[t1];
const int z2=pTb1[t2];
const int z3=pTb1[t3];
// backward Hadamard transform
const int iy0=z0+z2;
const int iy1=z1+z3;
const int iy2=z0-z2;
const int iy3=z1-z3;
    // output filtered pixel
pOut[p0_out]=iy0+iy1.
```

If Hadamard transform is used, and more than one filtered pixels from linear buffer of filtered samples are added to accumulation buffer, then the following pseudo-code describes filtering process of this scenario:

```
// reconstructed/predicted pixels scan
const int x0=pIn[p0];
const int x1=pIn[p1];
const int x2=pIn[p2];
const int x3=pIn[p3]; // p0-p3 define scan pattern
// 1D forward Hadamard transform
const int y0=x0+x2;
const int y1=x1+x3;
const int y2=x0-x2;
const int y3=x1-x3;
const int t0=y0+y1;
const int t1=y0-y1;
const int t2=y2+y3;
const int t3=y2-y3;
// frequency domain filtering
const int z0=pTb1[t0];
const int z1=pTb1[t1];
const int z2=pTb1[t2];
const int z3=pTb1[t3];
// backward Hadamard transform
const int iy0=z0+z2;
const int iy1=z1+z3;
const int iy2=z0-z2;
const int iy3=z1-z3.
```

As alternative embodiment the accumulation buffer should be initialized by unfiltered pixel values multiplied by maximum number of pixel values to be added in the block. The maximum number of pixel values to be added in the block is defined based on scan template. Indeed scan template defines a number of pixel values added for each position. Based on that, the maximum number from all positions in the block can be selected and used during accumulation buffer initialization. Then, during each accumulation step, the unfiltered pixel value is subtracted from corresponding filtered value and added to accumulation buffer:

```
// filtered pixels accumulation
pOut[p0]+=iy0+iy1// p0-p3 define scan pattern
pOut[p1]+=iy0-iy1
pOut[p2]+=iy2+iy3
pOut[p3]+=iy2-iy3.
```

For reducing bit depth of accumulated pixel values before placing into accumulation buffer result of backward transform may be normalized on size of transform (m):

```
pOut[p0]+=((iy0+iy1)>>HTDF_BIT_RND4);
pOut[p1]+=((iy0-iy1)>>HTDF_BIT_RND4);
pOut[p2]+=((iy2+iy3)>>HTDF_BIT_RND4);
pOut[p3]+=((iy2-iy3)>>HTDF_BIT_RND4);
``` where HTDF_BIT_RND4 is equal to 2 for transform size of 4.

This embodiment allows the system to avoid storing the number of pixels added to current position and allows for replacement division and multiplication by shift operation at the last normalization step and accumulation buffer initialization step correspondingly if the maximum number of pixel values added is a power of e.g., 2, 4, 8 etc.

To keep precision of normalization stage it can be performed in a following way:

```
// normalization
pFiltered[p0]=CLIP3(0, (1<<BIT_DEPTH)-1, (pOut[p0]+HTDF_CNT_SCALE_RND)>>HTDF_CNT_SCALE),
``` where HTDF_CNT_SCALE is Log 2 of the number of pixels placed into accumulating buffer, e.g. for amount of 4 HTDF_CNT_SCALE is equal to 2, and HTDF_CNT_SCALE_RND is equal to (1<<(HTDF_CNT_SCALE-1)). CLIP3 is a clipping function which ensures filtered sample is in allowed range between minimum and maximum sample value.

As was mentioned above to avoid changing of average luminance of filtered block it may be advantageous to skip filtering of first spectrum component (corresponding to DC value). That further allows to simplify filter implementation. In this case filtering step is as follows:

```
// frequency domain filtering
const int z0=t0;
const int z1=pTb1[t1];
const int z2=pTb1[t2];
const int z3=pTb1[t3].
```

For each pixel inside of reconstructed block or predicted block, a scan template is chosen based on position of filtering pixel inside reconstructed block or predicted block for steps 302 and 310. Scan template is chosen to guarantee all pixels be inside reconstructed CU or predicted CU and place close to processing pixel. Arbitrary scan order can be used inside template. For example, the predefined scan template is defined as set of spatial or raster offsets relative to a position of the current pixel inside the reconstructed block or predicted block, where offsets point to neighbor pixels are inside the reconstructed block or predicted block. Below is an example of scan template (0,0), (0,1), (1,0), (1,1).

Figure 4A:
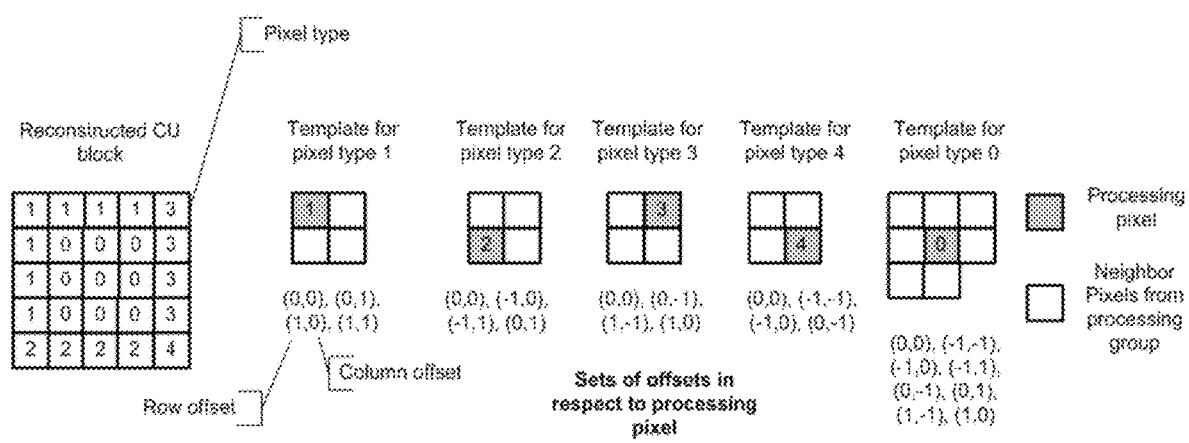
FIG. 4A illustrates templates for different pixel position inside square reconstructed block.

FIG. 4A illustrates an example of templates for different pixel position inside square block (For example, square CU predicted block, or square CU reconstructed block). According to this figure boundary pixels can be filtered based on 4 point transform and central pixels can be filtered based on 8 point transform.

For rectangular reconstructed blocks or predicted blocks, wherein size of one side is more size of other side the scan should be performed along long side. For example for horizontal rectangular block the following scan order can be used (0,-3), (0,-2), (0,-1), (0,0), (0,1), (0,2), (0,3), (0,4), where in each pair (y,x) x is horizontal offset and y is vertical offset in respect to position of filtering pixel inside filtering reconstructed block or predicted block.

The proposed filter can be selectively applied depending on conditions:

- for reconstructed blocks or predicted blocks with non-zero residual signal;
- depending on block size, e.g. for small reconstructed block or predicted block (minimal size is less than threshold);
- depending on an aspect ratio of the reconstructed block or predicted block;
- depending on prediction mode (Intra or Inter) of the reconstructed block or predicted block, e.g., by applying filter to inter-predicted blocks only; or
- for any combination of described above conditions.

For example, to avoid processing of small blocks thy filter can be bypassed (not applied) if block size is less or equal to 4×4 pixels. That reduces worst-case complexity which is usual corresponds to smallest block processing.

As another example filter is applied only to blocks that have non-zero residual signal. That is beneficial if quantization or residuals was used since the filter is aimed to improve quantization error. If block has no residual that maybe an indication that prediction is good and no further filtering is required.

As another example, since intra prediction normally is worse than inter, the filter can be applied to intra predicted blocks independently of presence of non-zero residual and applied to inter predicted blocks only if block has non-zero residual signal.

Filter parameter sigma and scan pattern may vary depending on conditions listed above.

Figure 4B:
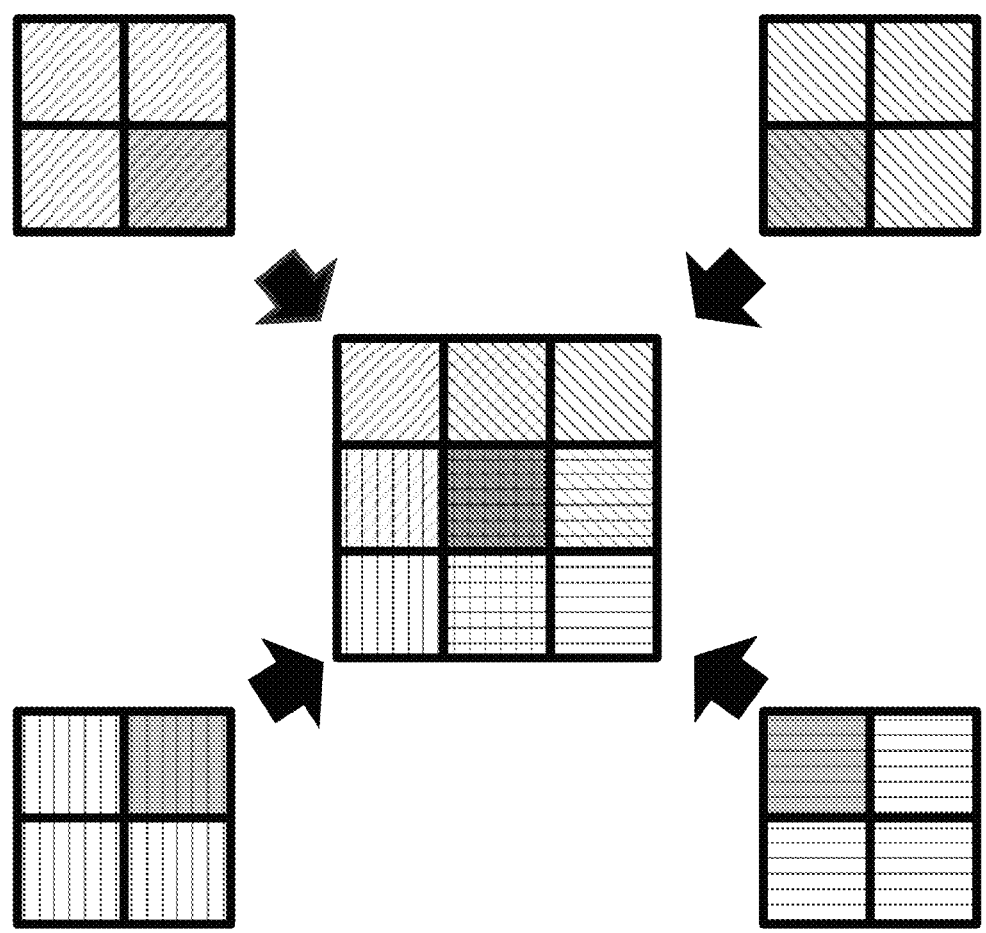
FIG. 4B illustrates equivalent filter shape for one pixel.

FIG. 4B illustrates equivalent filter shape considering one pixel inside of current block for exemplary scan template (0,0), (0,1), (1,0), (1,1). For the filtering of current pixel square area of 3×3 pixels is used (current pixel is marked by dark-gray color in the center of 3×3 square). Filtered pixel is obtained by combining transform domain filtered samples from four 2×2 groups. It can be understood that if current pixel is located in block border (e.g. top border) top left and top right 2×2 groups are unavailable and only two 2×2 groups (bottom left and bottom right) can be used for filtering. Furthermore if current pixel is located in block corner (e.g. top-left corner) only one 2×2 group (bottom right) can be used for filtering.

Figure 4C:
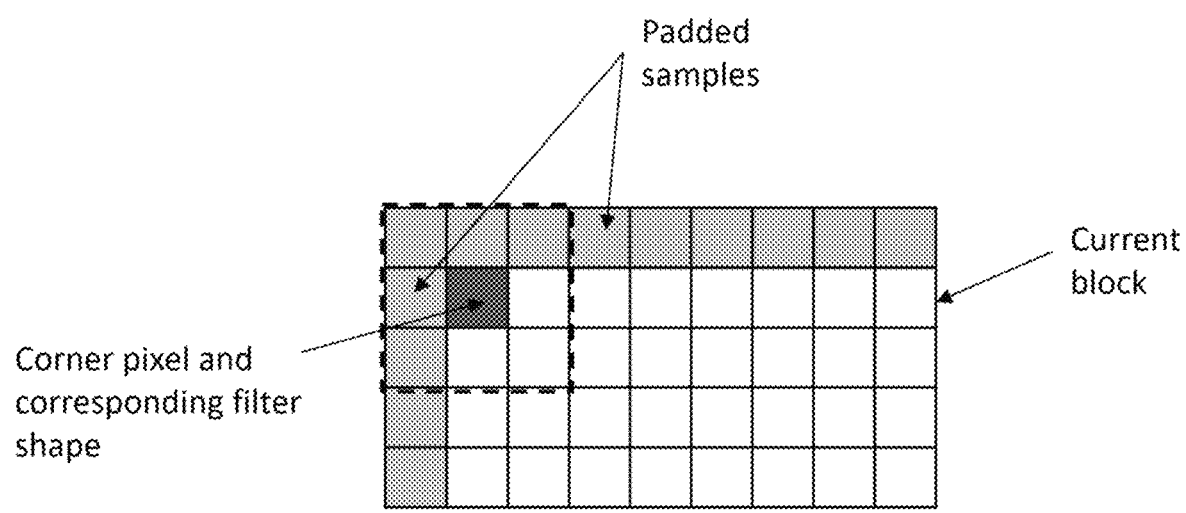
FIG. 4C gives an example of padding.

To increase quality of filtering by using more four 2×2 groups for border and corner pixels, the current block can be padded by additional samples. FIG. 4C gives an example of padding on left and top sides. Padding samples can be taken from already reconstructed blocks.

Figure 4D:
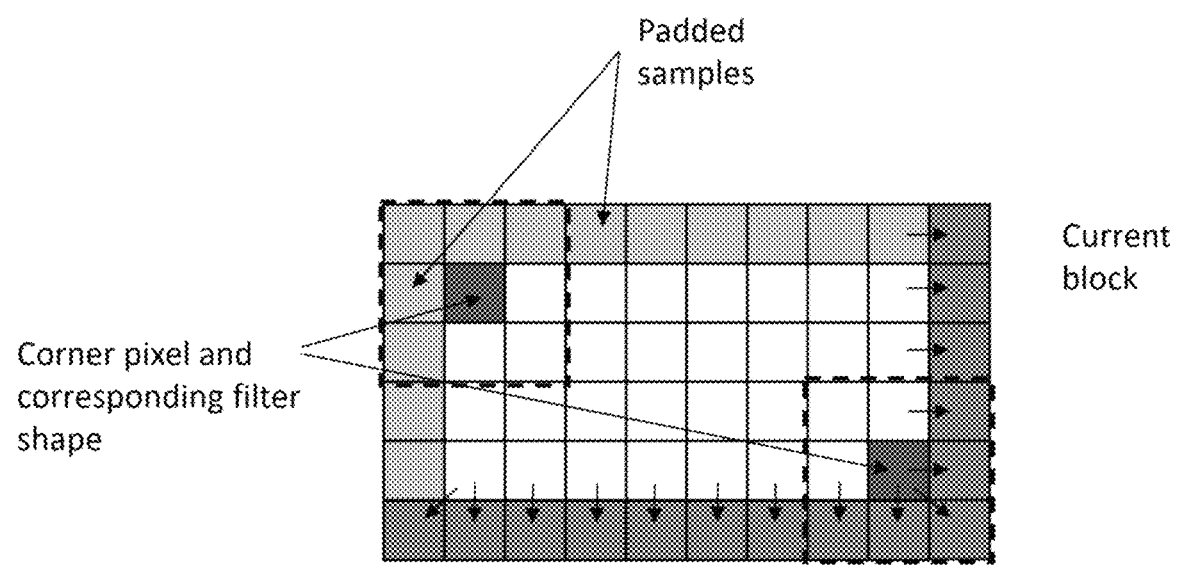
FIG. 4D gives another example of padding.

For further unification of filtering process for all pixels in block (four 2×2 groups are used for filtering of all pixels in current block), in addition to top-left padding current block can also be extended by bottom-right padding as illustrated on FIG. 4D. Unification of filtering is beneficial due to simplifying implementation by excluding special processing cases for corner pixels and/or border pixels.

Padding samples are preferably taken from adjusted neighboring samples from already reconstructed blocks. In state-of-the-art video codecs those already reconstructed blocks can be located either on left or top side from current block or on right or bottom side depending on block reconstruction order. Using more information from adjustment samples, it improves filtering quality and makes transition between blocks smoother.

Retrieving reconstructed samples from adjusted blocks or previously reconstructed blocks can require additional memory load for hardware or software implementation. To minimize or exclude additional memory, it is beneficial to use samples intended for intra prediction of current block which are commonly taken from one, two or more rows and columns from neighboring blocks adjusted to current block borders. These samples are usually stored in fast memory (also known as "line" buffer) for easy access for intra prediction and called reference samples of intra prediction.

It should be further noted that in some implementation, before performing intra prediction, reference sample (intra reference samples) are pre-processed before prediction e.g. by smoothing, sharpening, de-ringing or bilateral filtering. In this case it may be beneficial to use pre-processed samples for padding of current block.

If some samples in the padded area are not available, due to order of adjusted block reconstruction, required samples can be padded from the current block expanding border pixels to the padded area as illustrated on FIG. 4D.

Figure 5A:
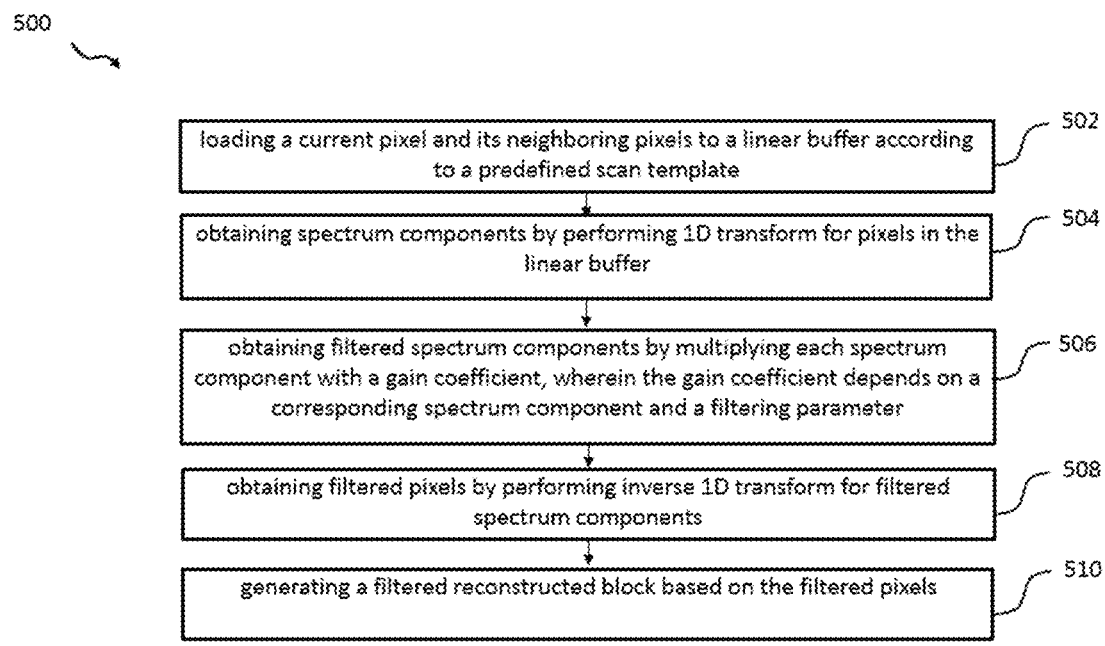
FIG. 5A shows a flow diagram illustrating steps of a filtering method according to an embodiment.

FIG. 5A shows a flow diagram illustrating steps of a corresponding in-loop filtering method 500 according to an embodiment. The reconstructed block comprises a plurality of pixels. The method 500 comprises the following steps loading (502) a current pixel and its neighboring pixels to a linear buffer according to a predefined scan template, obtaining (504) spectrum components by performing 1D transform for pixels in the linear buffer, obtaining (506) filtered spectrum components by multiplying each spectrum component with a gain coefficient, wherein the gain coefficient depends on a corresponding spectrum component and a filtering parameter, obtaining (508) filtered pixels by performing inverse 1D transform for filtered spectrum components, and generating (510) a filtered reconstructed block based on the filtered pixels estimated on previous processing steps. Method 500 can be performed by the encoding apparatus as shown in FIG. 1A and FIG. 1B and the decoding apparatus as shown in FIG. 2A and FIG. 2B. Detailed information 300 of FIG. 3A or information 300' of FIG. 3B are also applied to method 500 as shown in FIG. 5A.

Figure 5B:
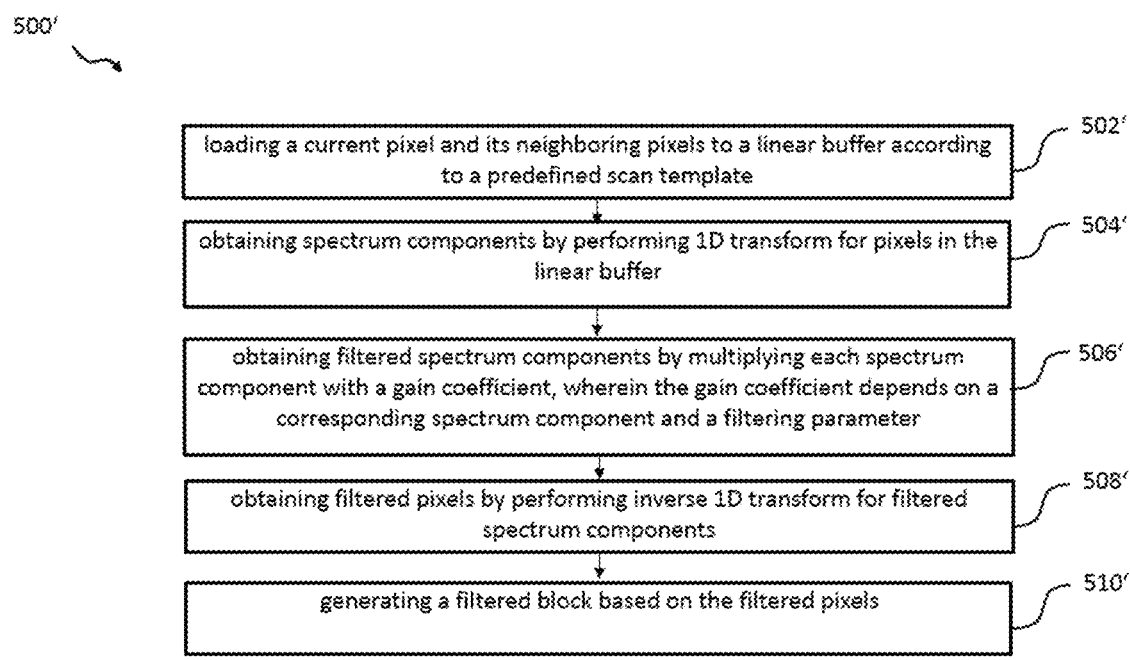
FIG. 5B shows a flow diagram illustrating steps of a filtering method according to an embodiment.

Similar to FIG. 5A, FIG. 5B shows a flow diagram illustrating steps of a corresponding in-loop filtering method 500' according to another embodiment. At this example, the block (or frame) is a predicted block, and the filtered block is a filtered predicted block. Detailed description of FIG. 5B is similar to FIG. 5A.

The hardware implementation is discussed.

Hadamard transform domain filter is placed just after block reconstruction and process samples that can be involved into subsequent blocks reconstruction particularly as a reference samples of intra prediction. Thus the latency introduced by the filter needs to be minimize to ensure entire reconstruction pipeline is not affected much.

Hadamard transform is considered to be relatively simple for hardware implementation. Only additions are required for its implementation but multiplications. As can be seen from below Pseudo code 1, forward and backward transform contains 4 addition which can be done in parallel or by reusing of intermediate results with two sequential addition operations.

```
Pseudo code 1:
for (int r = 0; r < height - 1; ++r)
{
    Pel *pIn = &block[r*strideBlk];
    Pel *pAcc = &accBlock[r*strideAcc];
    for (int c = 0; c < width - 1; ++c, pIn++, pOut++)
    {
        const int x0 = pIn[p0];
        const int x1 = pIn[p1];
        const int x2 = pIn[p2];
        const int x3 = pIn[p3];
        // forward transform
        const int y0 = x0 + x2;
        const int y1 = x1 + x3;
        const int y2 = x0 - x2;
        const int y3 = x1 - x3;
        const int t0 = y0 + y1;
        const int t1 = y0 - y1;
        const int t2 = y2 + y3;
        const int t3 = y2 - y3;
        // filtering
        const int z0 = t0; // skip DC
        const int z1 = RdTbl(t1, tbl, thr);
        const int z2 = RdTbl(t2, tbl, thr);
        const int z3 = RdTbl(t3, tbl, thr);
        // backward transform
        const int iy0 = z0 + z2;
        const int iy1 = z1 + z3;
        const int iy2 = z0 - z2;
        const int iy3 = z1 - z3;
        pAcc[p0_out] += ((iy0 + iy1) >> HTDF_BIT_RND4);
        pAcc[p1_out] += ((iy0 - iy1) >> HTDF_BIT_RND4);
        pAcc[p2_out] += ((iy2 + iy3) >> HTDF_BIT_RND4);
        pAcc[p3_out] += ((iy2 - iy3) >> HTDF_BIT_RND4);
        // normalization
        pIn[p0] = ClipPel((pOut[p0_out] + HTDF_CNT_SCALE_RND)
            >> HTDF_CNT_SCALE, clpRng);
    }
}
```

Forward and backward Hadamard transform can be implemented in hardware by using combinational logic. The more attention is required to fast and parallel access to the LUT.

The SRAM based LUT is discussed.

Figure 6:
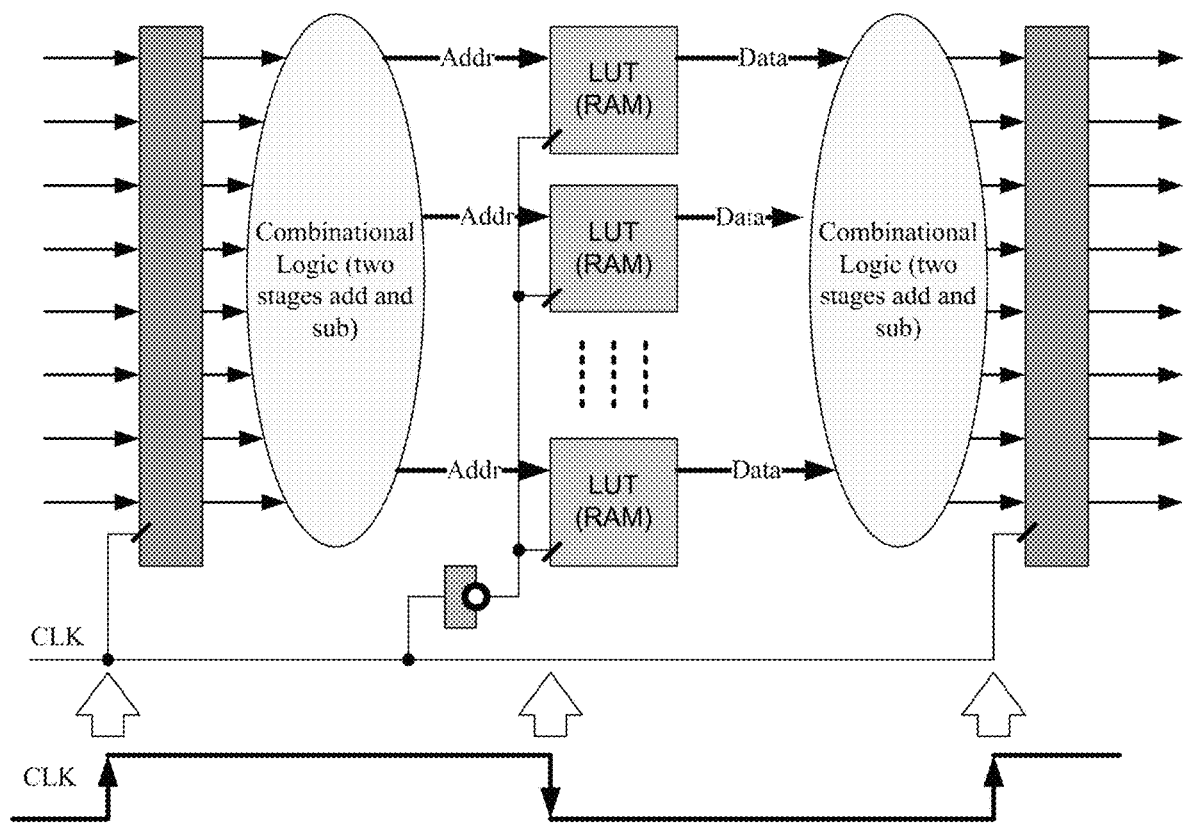
FIG. 6 is an example hardware filter design based on static random-access memory (SRAM).

In this example implementation, the LUT is stored in on-chip single port SRAM (FIG. 6).

Once data prom previous processing step are available in the buffer by rising edge of the clock it is accessed by combinational logic implementing forward Hadamard transform (containing two subsequent additions). After completing the combinational logic address is available for each LUT. Using invertor and falling edge of the clock the data is accessed from the SRAM. Second combinational logic implementing backward Hadamard transform and normalization is started immediately after data from LUT is available. The output filtered samples became available at the end of current clock cycle and are ready for processing by next algorithm at the next rising edge of the clock.

The flip-flop based LUT is discussed.

Figure 7:
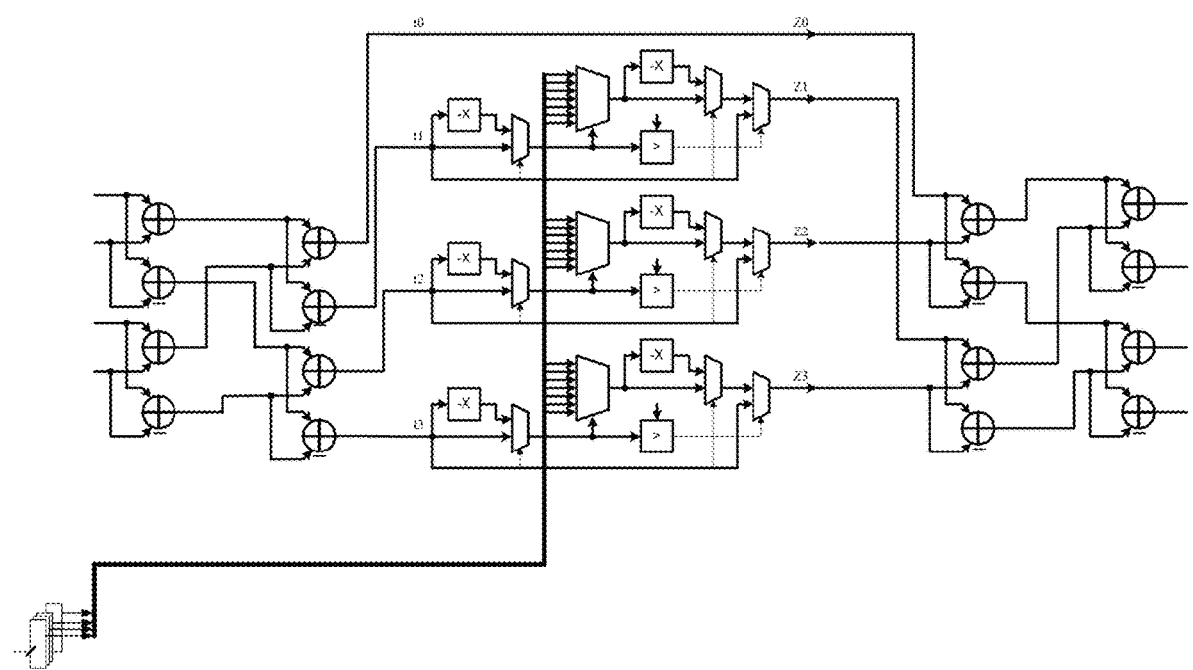
FIG. 7 is an exemplary hardware design of 2×2 group filtering based on flip-flops.

Considering that one table for filtering process is limited by 16 entries it looks more efficient to implement LUT based on flip-flops. Such design does not require several LUTs for parallel processing and clock edge for data access. Parallel access is provided by multiplexer as depicted in FIG. 7 illustrating exemplary design for processing one 2×2 group. In suggested design 16 flip-flops of 7 bits are required to provide parallel access during the filtering process. The QP specific LUT can be loaded to flip-plops once QP for current CU is available.

Figure 8:
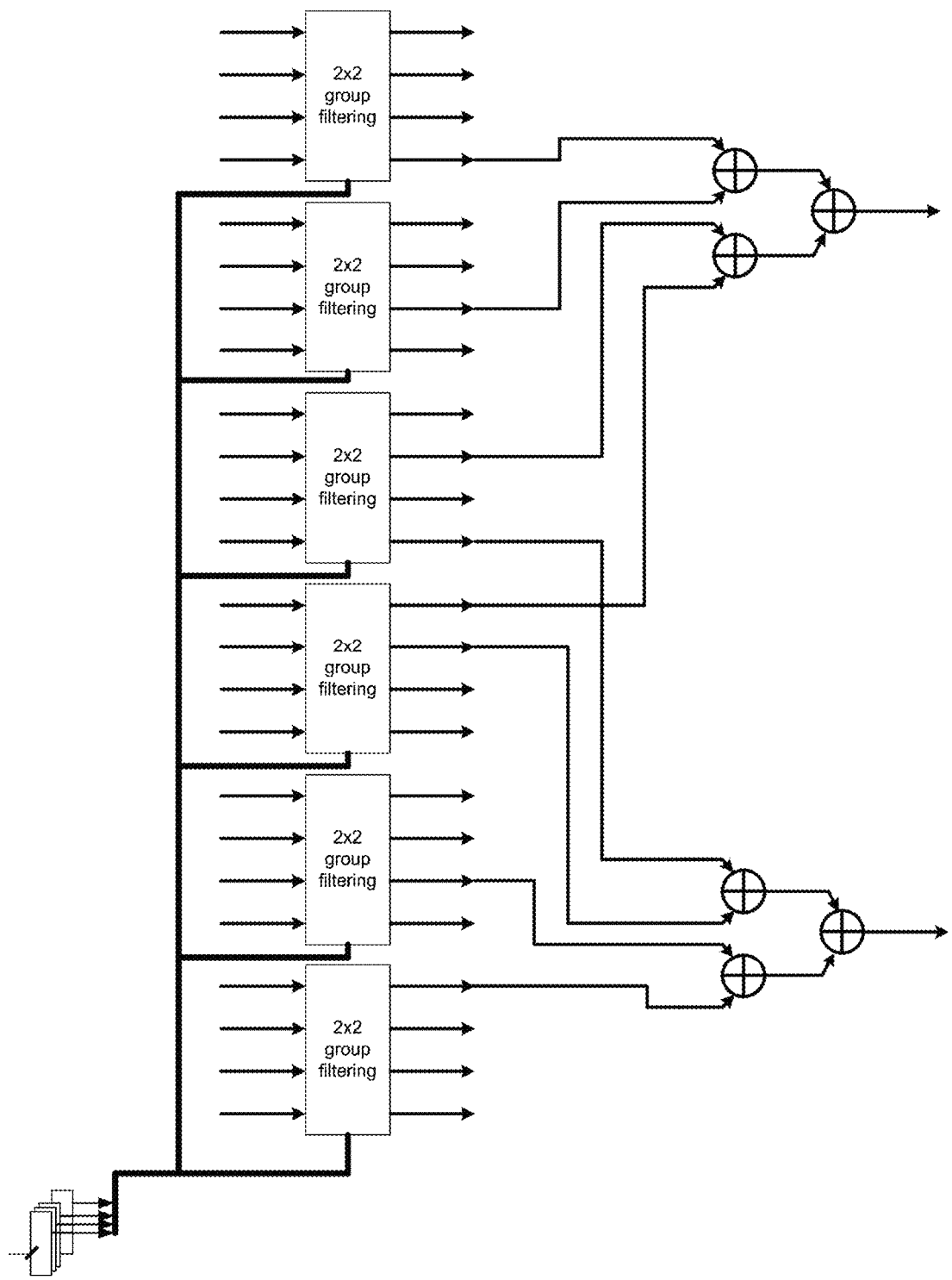
FIG. 8 shows an example of combining results of four 2×2 groups filtering with reusing of results of same spatial group final filter.

Combining results of four 2×2 groups filtering with reusing of results of same spatial group final filter output is generated as depicted on FIG. 8.

Given above analysis allows concluded that proposed filter can be implemented in hardware within one clock using either SRAM or flip-flop based LUT implementation.

A complexity analysis is discussed.

Measure impact on Bitrate/peak signal-to-noise ratio (PSNR) relative to the anchor(s).

Complexity analysis (e.g., encoding and decoding time measure, complexity analysis by filling the table below).

TABLE 1

CE14-3 complexity analysis summary

| Test # | filter shape | Computational complexity (# of multiplications/ additions/ shifts/checks*) per sample | Precision of multiply | Parallel friendly (each sample can be filtered independently from other samples) | Number of clock cycles | memory requirement | How to derive filter co-efficients | Minimal CU Size for applying filters |
|---|---|---|---|---|---|---|---|---|
| 14.3a | 3x3 | 0/20 + 4 1-bit add for round/5/6 | n/a | yes | <1 clock | 140 bytes (32 7-bit values per qp group) | Precalculated in LUT | 4x8, 8x4 |
| 14.3b | 3x3 | 0/20 + 4 1-bit add for round/5/6 | n/a | yes | <1 clock | 70 bytes (16 7-bit values per qp group) | Precalculated in LUT | 4x8, 8x4 |

*max/min/abs are countered as checks

Experimental results are discussed.

Objective results are discussed.

The objective performance is presented in the following tables:

TABLE 2

Coding performance of test 14-3a

All Intra Main10
Over BMS-2.0.1 with virtual traffic manager (VTM) config

| | Y | U | V | EncT | DecT |
|---|---|---|---|---|---|
| Class A1 | −0.19% | 0.29% | 0.24% | 110% | 115% |
| Class A2 | −0.35% | 0.31% | 0.32% | 109% | 112% |
| Class B | −0.42% | 0.29% | 0.32% | 109% | 113% |
| Class C | −0.83% | 0.23% | 0.42% | 110% | 110% |
| Class E | −0.54% | 0.28% | 0.19% | 109% | 114% |
| Overall | −0.48% | 0.28% | 0.31% | 109% | 112% |
| Class D | −0.61% | 0.47% | 0.01% | 109% | 108% |
| Class F (optional) | −0.82% | 0.07% | 0.04% | 108% | 107% |

Random Access Main 10
Over BMS-2.0.1 with VTM config

| | Y | U | V | EncT | DecT |
|---|---|---|---|---|---|
| Class A1 | −0.43% | −0.23% | −0.25% | 105% | 104% |
| Class A2 | −0.92% | −0.57% | −0.43% | 105% | 103% |
| Class B | −0.69% | −0.02% | −0.27% | 106% | 104% |
| Class C | −0.75% | 0.10% | 0.14% | 105% | 104% |
| Class E | | | | | |
| Overall | −0.70% | −0.14% | −0.19% | 105% | 104% |
| Class D | −0.67% | −0.14% | 0.53% | 104% | 103% |
| Class F (optional) | −0.77% | 0.10% | 0.13% | 104% | 102% |

Low delay B Main10
Over BMS-2.0.1 with VTM config

| | Y | U | V | EncT | DecT |
|---|---|---|---|---|---|
| Class A1 | | | | | |
| Class A2 | | | | | |
| Class B | −0.58% | 0.52% | 0.54% | 104% | 104% |
| Class C | −0.74% | 0.33% | 0.52% | 104% | 104% |
| Class E | −0.75% | 0.31% | 1.09% | 102% | 101% |
| Overall | −0.68% | 0.40% | 0.67% | 104% | 103% |
| Class D | −0.90% | 0.75% | 0.28% | 104% | 104% |
| Class F (optional) | −0.73% | 0.20% | −0.09% | 103% | 102% |

TABLE 3

Coding performance of test 14-3b

All Intra Main10
Over BMS-2.0.1 with VTM config

| | Y | U | V | EncT | DecT |
|---|---|---|---|---|---|
| Class A1 | −0.17% | 0.28% | 0.28% | 110% | 115% |
| Class A2 | −0.33% | 0.27% | 0.29% | 109% | 112% |
| Class B | −0.40% | 0.31% | 0.39% | 109% | 113% |
| Class C | −0.82% | 0.20% | 0.32% | 109% | 110% |
| Class E | −0.54% | 0.34% | 0.25% | 109% | 113% |
| Overall | −0.47% | 0.28% | 0.32% | 109% | 112% |
| Class D | −0.65% | 0.43% | 0.22% | 109% | 108% |
| Class F (optional) | −0.81% | 0.01% | 0.12% | 108% | 107% |

Random Access Main 10
Over BMS-2.0.1 with VTM config

| | Y | U | V | EncT | DecT |
|---|---|---|---|---|---|
| Class A1 | −0.41% | −0.36% | −0.24% | 105% | 105% |
| Class A2 | −0.92% | −0.49% | −0.37% | 105% | 103% |
| Class B | −0.69% | −0.12% | 0.12% | 106% | 104% |
| Class C | −0.75% | 0.14% | 0.10% | 105% | 104% |
| Class E | | | | | |
| Overall | −0.70% | −0.17% | −0.06% | 105% | 104% |
| Class D | −0.69% | −0.30% | 0.49% | 104% | 103% |
| Class F (optional) | −0.82% | 0.11% | 0.11% | 104% | 102% |

Low delay B Main10
Over BMS-2.0.1 with VTM config

| | Y | U | V | EncT | DecT |
|---|---|---|---|---|---|
| Class A1 | | | | | |
| Class A2 | | | | | |
| Class B | −0.57% | 0.49% | 0.69% | 104% | 104% |
| Class C | −0.76% | 0.31% | 0.42% | 104% | 106% |
| Class E | −0.67% | −0.66% | −0.48% | 102% | 102% |
| Overall | −0.66% | 0.14% | 0.31% | 103% | 104% |
| Class D | −0.88% | 0.92% | 0.31% | 103% | 105% |
| Class F (optional) | −0.74% | 0.38% | −0.15% | 103% | 102% |

Suggested LUT 70 bytes with 16 bytes per QP, allowing 1 clock hardware implementation. Etc. Proposed to adopt Hadamard transform domain filter to next version of VTM.

The following references are incorporated herein by reference as if reproduced in their entirety.

JVET document JVET-K0068.

The below illustrate examples for optimizing the LUT.

As one example 1, a set of QPs are chosen to generate the LUT, where the set of QPs include a first QP corresponding to (i) index and a second QP corresponding to (i+1) index, and the first QP and the second QP have a constant interval. For example, the interval may equal to 8, 10 or 16.

For example, taking the constant interval is 8 as an example, sparse table by having LUT for qp={20, 28, 36, 44, 52}. The interval between the first qp 20 and the second qp 28 is 8. Similarly, the interval between the second qp 28 and the third qp 36 is 8. During filtering table with closest QP is chosen.

As another example, taking the constant interval is 8 as an example, sparse table by having LUT for qp={18, 26, 34, 42, 50}. The interval between the first qp 18 and the second qp 26 is 8. Similarly, the interval between the second qp 26 and the third qp 34 is 8. During filtering table with closest QP is chosen. LUT size is 5×128 (640 bytes).

Below is pseudo code 2 reflecting which QPs are chosen to generate LUTs.

```
Pseudo code 2:
#define HTDF_MIN_QP         20
#define HTDF_MAX_QP         (MAX_QP +1)
#define HTDF_QP_ROUND       8
   for (int qp_in = HTDF_MIN_QP; qp_in < HTDF_MAX_QP; qp_in++)
   {
      int idx = ( (qp_in - HTDF_MIN_QP) + (HTDF_QP_ROUND>>1) ) / HTDF_QP_ROUND;
      int qp = idx*HTDF_QP_ROUND + HTDF_MIN_QP;
      if (idxPrev i = idx)
      {
         tblGen(HTDFTable[idx], qp);
         idxPrev = idx;
      }
   }
```

At the pseudo code, HTDF_QP_ROUND represents the constant interval. Having the interval as power of two is advantageous allowing to implement division operation for index calculation as a shift. It should be noted that different values of constant interval may be chosen e.g. 2, 4, 10, 15 or 16 etc. Moreover as alternative embodiment an interval may be arbitrary and which LUT is calculated for arbitrary set of QPs.

During filtering process index corresponding LUT for given QP is calculated as:

int idx=((qp-HTDF_MIN_QP)+
      (HTDF_QP_ROUND>>1))/
      HTDF_QP_ROUND, or alternatively with less precision:

int idx=(qp-HTDF_MIN_QP)/HTDF_QP_ROUND.

If constant interval is power of 2, e.g. then index of LUT can be advantageously calculated using shift operation instead division:

int idx=(qp-HTDF_MIN_
      QP)>>HTDF_QP_ROUND_LOG 2=(qp-
      HTDF_MIN_QP)>>3.

As another example 2, decoder or encoder drops N bits from table values, and N is an integer. That allows have sparse LUT representation storing only selected values from given range. For example, N is 3. Max table value is 127 (7 bits), dropping 3 bits, the result is 4 bits, that is 16 entries of 7 bit values—16 bytes roughly.

Below is pseudo code 3 describing how LUT is generated according to given qp value.

```
Pseudo code 3.
#define HTDF_TBL_SH         3
#define HTDF_TBL_RND        ((1<<HTDF_TBL_SH)>>1)
void HTDFilter::tblGen(HTDF_TBL_TYPE *tbl, int qp)
{
   float sigma = (2.64f)*powf(2.0f, (0.1269f)*(qp - 11));
   int sigma_l = (int)(sigma * HTDF_SIGMA_SCALE );
   sigma_l *= sigma_l;
   sigma_l *= 4;
   for (int k_in = 0; k_in < HTDF_SHORT_TBL_THR; k_in++)
   {
      const int Idx = (k_in + HTDF_TBL_RND)>>HTDF_TBL_SH;
      const int k = Idx << HTDF_TBL_SH;
      unsigned int num = (k*k*k) << 10;
      int den = ((k*k) << 10) + sigma_l;
      int value_long = num / den;
      HTDF_TBL_TYPE value_int = (HTDF_TBL_TYPE)value_long;
      tbl[Idx] = value_int;
   }
}
```

In given example HTDF_TBL_SH defines number of bits to drop which may be 1, 2, 3, 4 etc.

Below is pseudo code illustrating access to sparse LUT during filtration:

tbl[(z+HTDF_*TBL_RND*)>>HTDF_*TBL_SH*].

Figure 9:
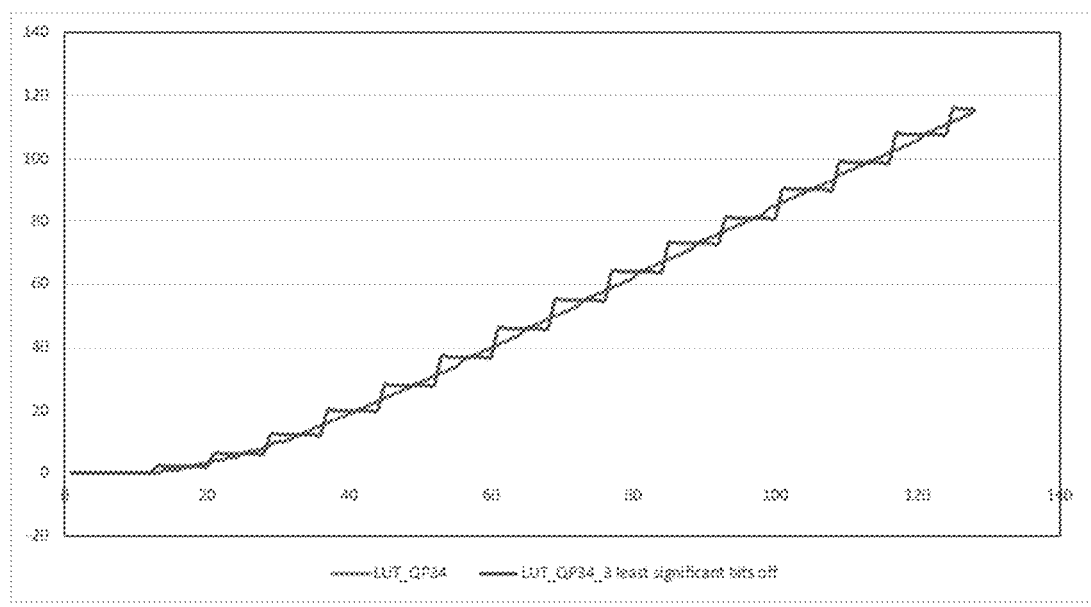
FIG. 9 as an example, shows the result of optimizing the LUT.

When combine the above examples 1 and 2, FIG. 9 as an example, shows the result of optimizing the size of the LUT with 3 least significant bits off.

It should be noted that amount of LUT entries is defined by HTDF_SHORT_TBL_THR (threshold value from equation 1 described in FIG. 3A. 3B) and HTDF_TBL_SH number of bits dropped. Considering threshold equal to 128 (that is 1<<7) and bits dropped 3 gives number of tables entries equal to 1<<(7-3)=1<<4=16. As describe above the LUT threshold is preferably chosen to make result of gain coefficient G (i,σ) close to 1 and as it also described there the threshold may differ depending on QP. Thus for LUT generation for higher QP values it may be beneficial to increase threshold from 128 (1<<7) to e.g. 256 (1<<8). In that case keeping same precision of LUT entries (e.g. with dropped 3 bits) will require 32 entries (32=1<< (8-3)=1<<5). Alternatively to keep same LUT size for higher QPs as for lower QPs the precision may be further reduced to 4 to keep 16 entries of table 16=1<<(8-4)=1<<4.

Figure 10:
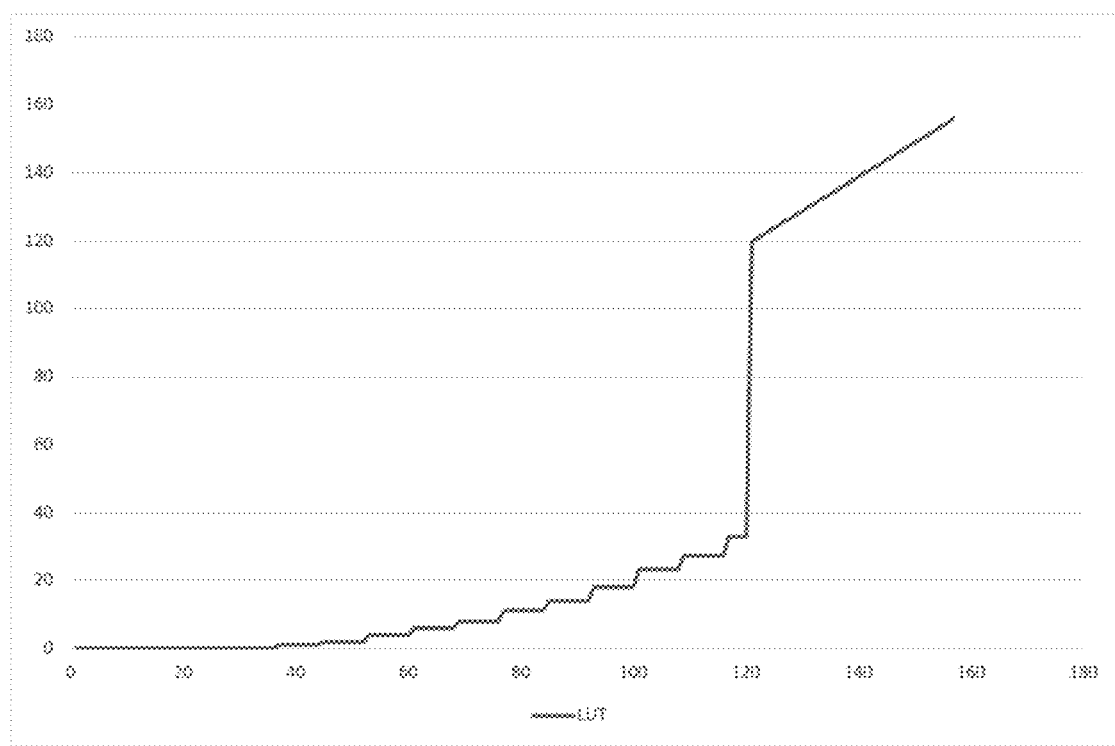
FIG. 10 as an example, shows undesirable gap in filter transfer function.

In some implementation keeping LUT size limited and having THR in order to keep a result of the equation described in FIG. 3A, 3B for gain coefficient G (i,σ) close to 1 maybe contradictory. Indeed at high QP values (which leads to high a value) keeping LUT size limited by e.g. 16 entries may lead to undesirable gap in filter transfer function (which is represented by LUT) around value 120 as depicted on FIG. 10 (which also includes method of LUT subsampling by dropping of 3 least significant bits off).

Figure 11:
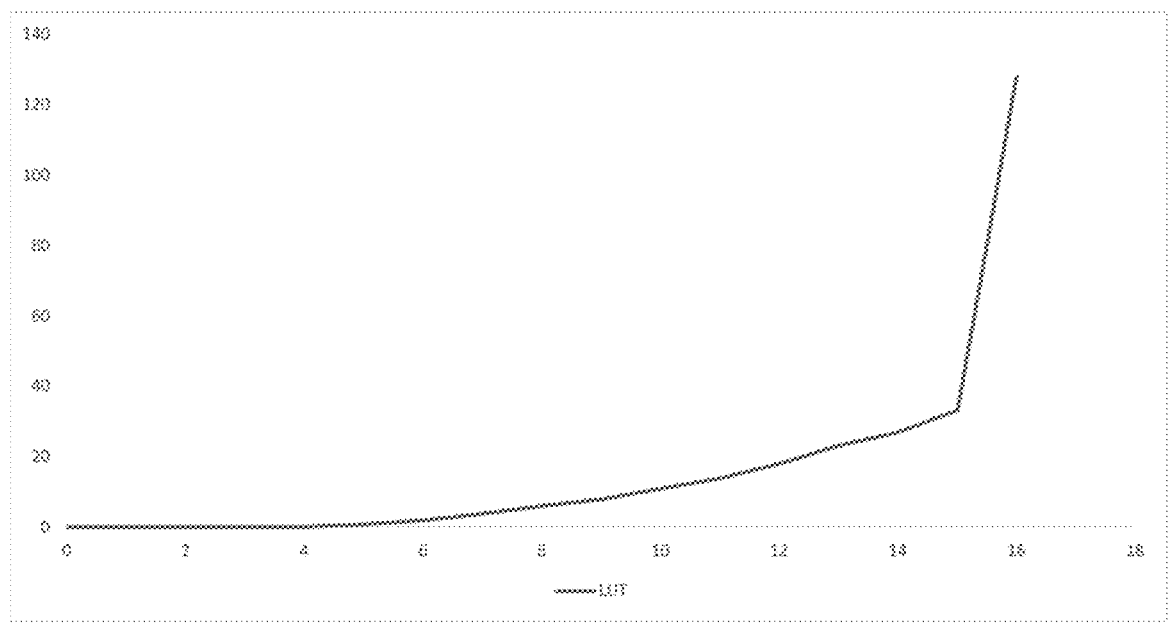
FIG. 11 as an example, represents same table with table entries being plot one-by-one.

FIG. 11 represents same table with table entries being plot one-by-one without consideration LUT sub sampling effect illustrating gap between last LUT entry at index 15 and next point in filter transfer function at index 16.

Figure 12:
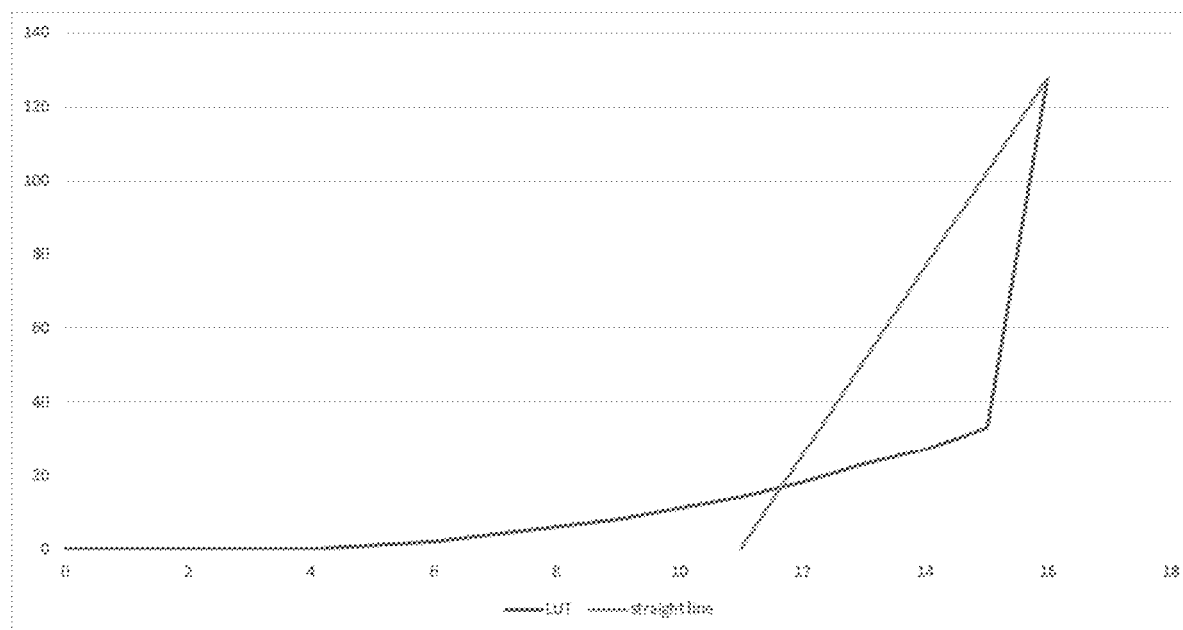
FIG. 12 as an example, illustrates the method how gap can be eliminated using auxiliary function.

FIG. 12 illustrates the method how gap can be eliminated using auxiliary function coming through THR value at the argument of corresponding to last LUT entry+1, e.g. by using straight line equation (pointed by green color), coming through point THR=128 at argument 16 that corresponds to argument of last LUT entry (which is 15) increased by 1 or in other words LUT size (which is 16) and crossing x-axis at some point (e.g. at a value of 11 like in given example). It should be noted that other types of auxiliary functions can be used based on same principle, e.g. exponential, logarithmic, parabolic etc. or combination of them.

Figure 13:
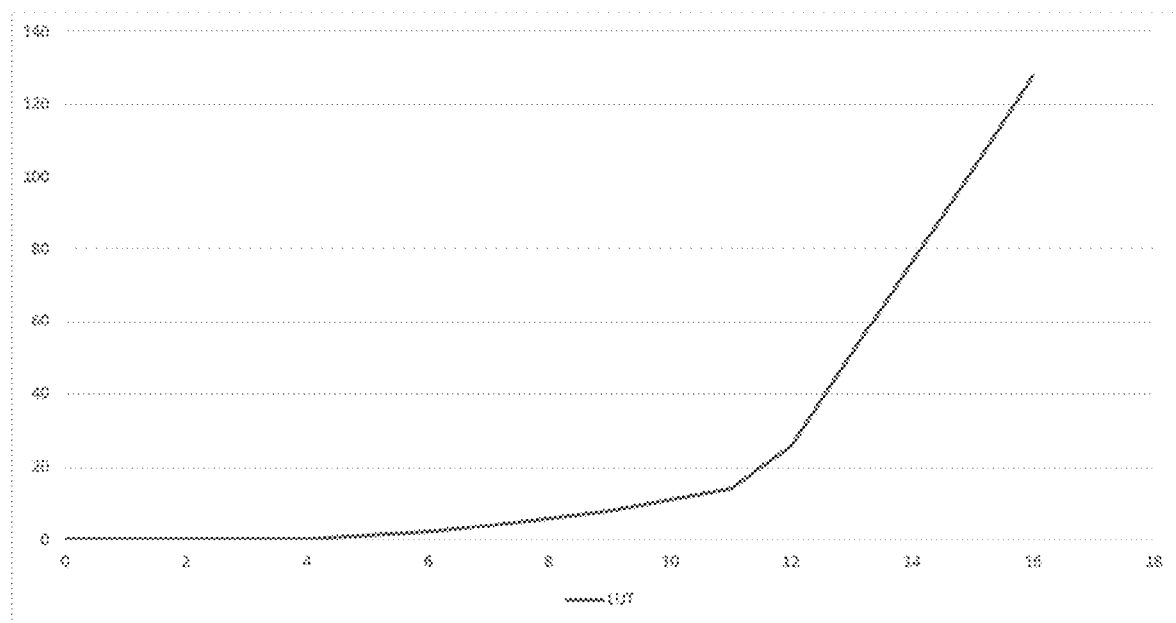
FIG. 13 illustrates the example of eliminating gap by taking maximum from two values while generating the LUT.

FIG. 13 Illustrates the example of eliminating gap by taken maximum from two values while generating the LUT, where the first value is LUT entry as described above $$LUT(R_i, \sigma) = \frac{R_i^3}{R_i^2 + m * \sigma^2},$$

and the second is a value of AuxiliaryFunction (straight line in this example) at the same argument i:

$$LUT(R_i, \sigma) = \max\left(\frac{R_i^3}{R_i^2 + m * \sigma^2}, AuxiliaryFunc_\sigma(i)\right)$$

where $AuxiliaryFunc_\sigma(i)$ represents the auxiliary function, and the auxiliary function has a value equal to THR at i corresponding to an argument of last LUT+1.

Figure 14:
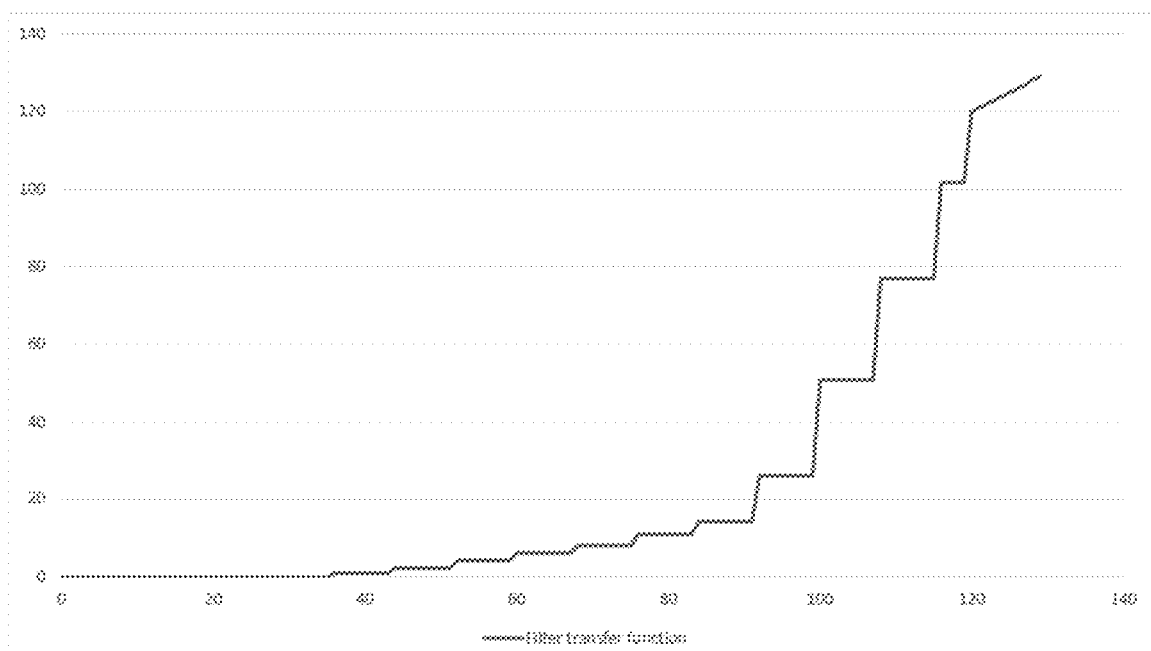
FIG. 14, as an example, illustrates filter transfer function after applying described above method.

FIG. 14 illustrates filter transfer function after applying described above method of using auxiliary straight line equation and LUT subsampling by dropping 3 least significant bits.

Figure 15:
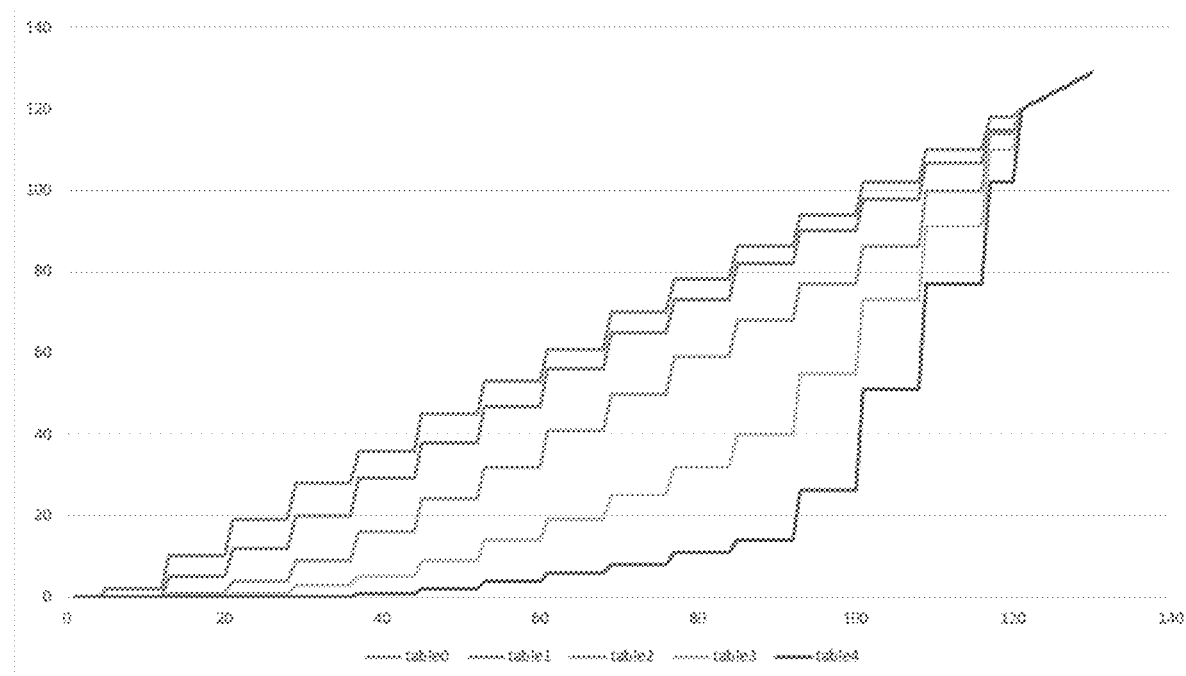
FIG. 15 illustrates an example of filter transfer functions depending on five QPs in the set.

As described in the complexity analysis above in FIG. 7, one LUT can used for group of QPs. To cover the possible QP range the predefined QP set is used and one LUT is generated for each QP from the set. The FIG. 15 illustrates example of filter transfer functions depending on five QPs in the set and corresponding tables (from 0 to 4). In this example the table 4 is generated using in examples for optimizing LUTs in FIG. 7 with straight-line auxiliary function crossing x-axis at the value of 11, and table 3 is generated using same method with straight-line auxiliary function crossing x-axis at the value of 9. The tables used in this example have values according to:
table0={0, 2, 10, 19, 28, 36, 45, 53, 61, 70, 78, 86, 94, 102, 110, 118,},
table1={0, 0, 5, 12, 20, 29, 38, 47, 56, 65, 73, 82, 90, 98, 107, 115,},
table2={0, 0, 1, 4, 9, 16, 24, 32, 41, 50, 59, 68, 77, 86, 94, 103,},
table3={0, 0, 0, 1, 3, 5, 9, 14, 19, 25, 32, 40, 55, 73, 91, 110,},
table4={0, 0, 0, 0, 0, 1, 2, 4, 6, 8, 11, 14, 26, 51, 77, 102,}.

Figure 16:
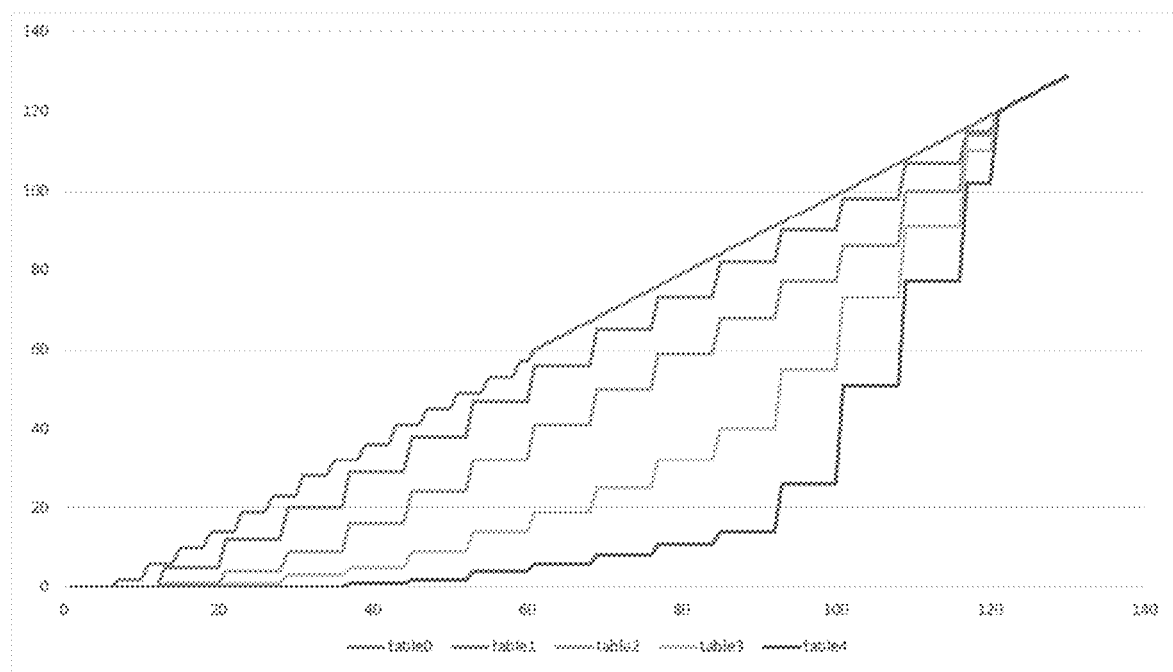
FIG. 16 illustrates an example of filter transfer functions for five QPs in the set based on corresponding tables.

As described above in examples for optimizimg the LUT described in FIG. 7, the method of table subsampling can drop N bits from table values to reduce table size. As also mentioned in these examples for optimizing the LUT described in FIG. 7, N may be different depending on QP used for certain table generation and selected THR value for this table. For example for lower QP values the filtering parameter σ is relatively lower than for higher QPs. Thus the absolute value of THR can be reduced without sacrificing of performance. Furthermore to keep table size same for all QPs in the set (that is beneficial for simplifying implementation) and reduce subsampling rate for lower QPs (which correspond for less compression level and better reconstructed picture quality) it may be beneficial to reduce the amount of dropped bits N in comparison to other QP tables, e.g. by setting N for lover QP equal to 2 and setting THR to 64. The FIG. 16 illustrates example of filter transfer functions for five QPs in the set based on corresponding tables (from 0 to 4) with N set to 2 for first table (corresponding to lover QP range) and N set to 3 for other tables. This example also includes method of using AuxiliaryFunction for table 3 and table 4 generation as described for psuedo code 2 that is described in FIG. 7. For table 4 straight-line auxiliary function crosses the x-axis at the value of 11. For table 4 straight-line auxiliary function crosses the x-axis at the value of 9. The tables used in this example have values according to:
table0={0, 0, 2, 6, 10, 14, 19, 23, 28, 32, 36, 41, 45, 49, 53, 57,},
table1={0, 0, 5, 12, 20, 29, 38, 47, 56, 65, 73, 82, 90, 98, 107, 115,},
table2={0, 0, 1, 4, 9, 16, 24, 32, 41, 50, 59, 68, 77, 86, 94, 103,},
table3={0, 0, 0, 1, 3, 5, 9, 14, 19, 25, 32, 40, 55, 73, 91, 110,},
table4={0, 0, 0, 0, 0, 1, 2, 4, 6, 8, 11, 14, 26, 51, 77, 102,}.

Figure 17:
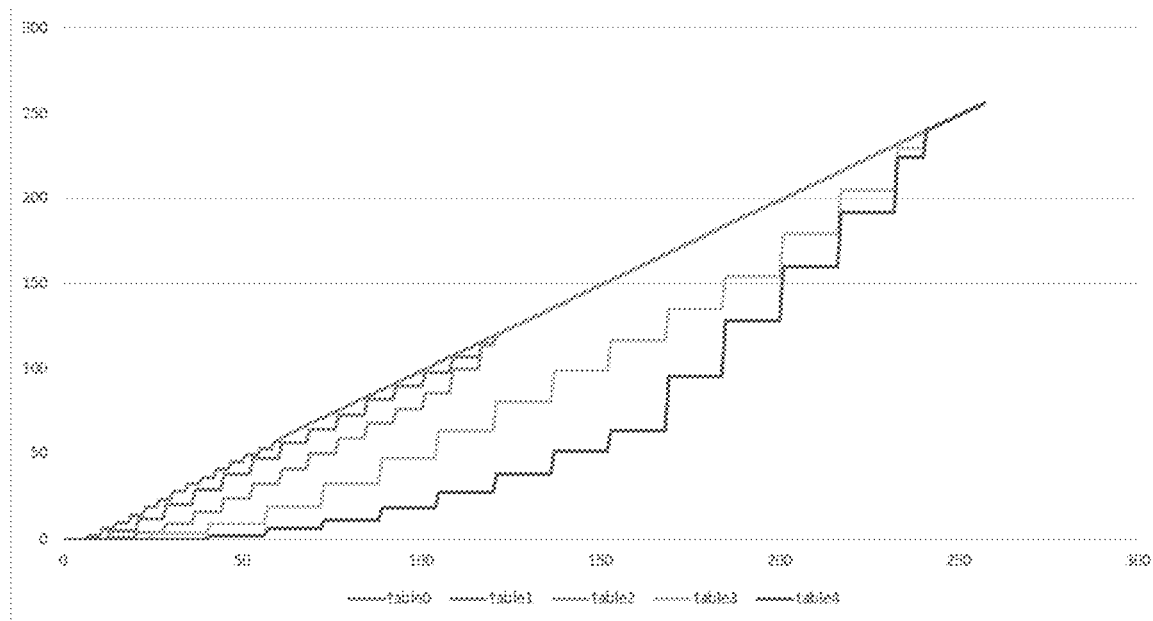
FIG. 17 illustrates an example of filter transfer functions for five QPs in the set based on corresponding tables.

As described above in examples for optimizing the LUT described in FIG. 7, the method of table subsampling can drop N bits from table values to reduce table size. As also mentioned in these examples for optimizing the LUT described in FIG. 7, N may be different depending on QP used for certain table generation and selected THR value for this table. For example for higher QP values the filtering parameter σ is relatively higher than for lower QPs that may require on increase THR value to keep equation described in FIG. 3A, 3B for gain coefficient G (i,σ) closer to 1. At the same time to keep LUT size same for all QPs in the set (which is beneficial due to simplification of implementation) and also considering that for higher QP values reconstructed picture has more distortions and increasing subsampling of LUT is acceptable due to subjectively unnoticeable effect of LUT subsampling in presence of strong compression artifacts the value N of least significant bitts dropped may be increased to 4 e.g. for last and for second last table in the set. FIG. 17 illustrates example of filter transfer functions for five QPs in the set based on corresponding tables (from 0 to 4) with N set to 2 for first table (table 0 corresponding to lover QP range), N set to 4 for last and second last table (table 3 and table 4) and N set to 3 for other tables. In this example TRH is set to 64 for first table generation, set to 256 for last end second last table and set to 128 for rest tables. This example also includes method of using AuxiliaryFunction for table 3 and table 4 generation as described for psuedo code 2 that was described in FIG. 7. For table 4 straight-line auxiliary function crosses the x-axis at the value of 6. For table 4 straight-line auxiliary function crosses the x-axis at the value of 8. The tables used in this example have values according to:
table0={0, 0, 2, 6, 10, 14, 19, 23, 28, 32, 36, 41, 45, 49, 53, 57,},
table1={0, 0, 5, 12, 20, 29, 38, 47, 56, 65, 73, 82, 90, 98, 107, 115,}, table2={0, 0, 1, 4, 9, 16, 24, 32, 41, 50, 59, 68, 77, 86, 94, 103,}, table3={0, 0, 3, 9, 19, 32, 47, 64, 81, 99, 117, 135, 154, 179, 205, 230,}, table4={0, 0, 0, 2, 6, 11, 18, 27, 38, 51, 64, 96, 128, 160, 192, 224,}.

As another possible implementation the transform comprises taking neighboring sample value differences and filtering them using LUT.

Filtering a sample is performed with the help of its 8-neighbors. These are shown in FIG. 18, where the sample to be filtered is denoted $I_C$ for "center intensity."

Here, $I_R$ denotes the sample to the right, $I_L$ the one to the left, $I_A$ and $I_B$ denotes the samples above and below respectively. Furthermore, cardinal directions are used to denote the diagonal neighbors. Hence $I_{NW}$ is short for "north-west" and denotes the sample one step up and one step to the left, etc.

Figure 18:
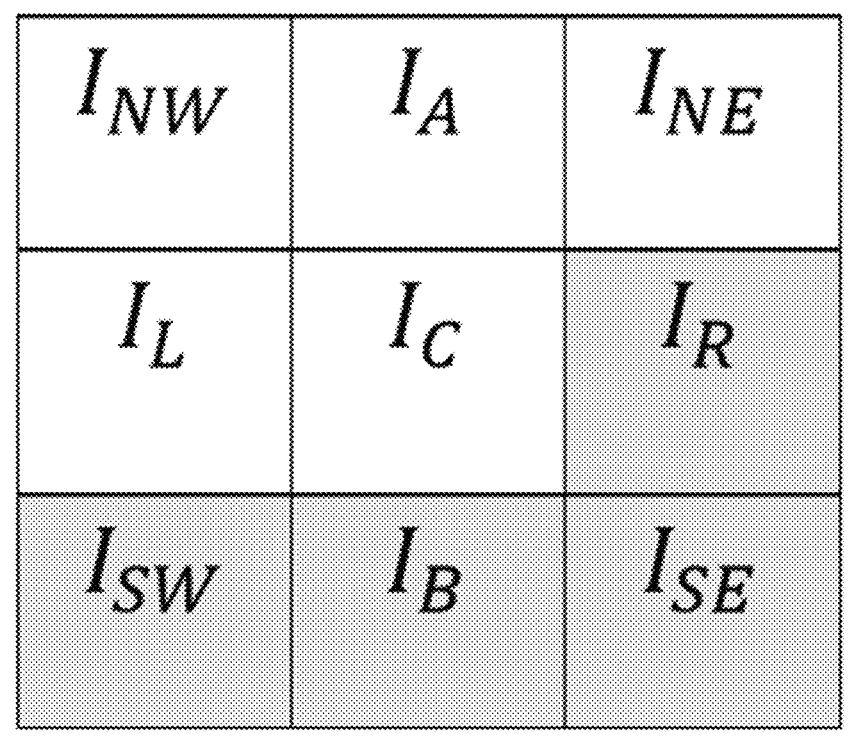

During filtering, we only need to carry out calculations for the neighbors marked with gray in FIG. 18. The reason is that the filter contribution from the remaining neighbors can be easily inferred from previously filtered samples. As an example, the contribution from $I_L$ for the current sample is equal to the negative of the contribution from $I_R$ when filtering the sample to the left.

Taking the right neighbor $I_R$ as an example, we first calculate the downshifted difference against the center sample $I_C$:

$$\Delta I_R = (I_R - I_C + 4) \gg 3.$$

This value is then used to obtain a modifier value $m_R$ using a LUT. Only positive values are stored in the LUT, so if the value is negative, we negate the value of the LUT output. Furthermore, since it is difficult to implement LUTs longer than 16 items using single instruction, multiple data (SIMD) instructions, we clamp the value at 15:

$$cI_R = \min(15, |\Delta I_R|),$$

$$m_R = \begin{cases} LUT(cI_R) & \text{if } \Delta I_R \geq 0 \\ -LUT(cI_R) & \text{otherwise} \end{cases}.$$

The modifier value $m_B$ for the neighbor below is calculated analogously. The LUT used depends on the qp:

LUT={0,4,4,4,3,2,1,2,1,1,1,1,0,1,1,−1} if 17<qp≤22,
LUT={0,8,11,11,7,5,5,4,5,4,4,2,2,2,2, −2} if 22<qp≤27,
LUT={0,9,16,19,22,22,20,15,12,12,11,9,9,7,8, −3} if 27<qp≤32,
LUT={0,12,21,28,33,36,40,40,40,36,29,22,19,17,15, −3} if 32<qp≤37,
LUT={0,17,23,33,37,41,44,44,45,44,42,27,22,17,15, −3} if qp>37.

For the diagonal neighbors, an extra shift by one is used to compensate for the fact that a diagonal neighbor is farther from the center than a neighbor to the right or below:

$$\Delta I_{SW} = (I_{SW} - I_C + 4) \gg 3,$$

$$cI_{SW} = \min(15, |\Delta I_{SW}|),$$

$$m_{SW} = \begin{cases} LUT(cI_{SW}) \gg 1 & \text{if } \Delta I_R \geq 0 \\ (-LUT(cI_{SW})) \gg 1 & \text{otherwise} \end{cases}.$$

Having calculated $m_R$, $m_B$, $m_{SW}$ and $m_{SE}$ for the current sample, and retrieved $m_A$, $m_L$, $m_{NW}$ and $m_{NE}$ from previously filtered neighbors, we can now form the sum of the modifier values.

$$m_{sum} = m_A + m_B + m_L + m_R + m_{NW} + m_{NE} + m_{SW} + m_{SE}.$$

For small intra blocks, we want to filter more strongly, which corresponds to an $m_{sum}$ value of larger magnitude. For large blocks, we want to filter weaklier. This can be achieved by calculating a corrected modifier value $$cm_{sum} = (k_1 \& (m_{sum} \ll 1) + k_2 \& m_{sum}) \gg 1,$$

where $k_1$ and $k_2$ are one-bit numbers and the & operator calculates logical AND between the left operand and all of the bits of the right operand. Setting $k_1$ and $k_2$ according to Table 1 gives the listed effective strengths.

| | D = min(block$_{width}$, block$_{height}$) | | |
|---|---|---|---|
| | D ≤ 4 | 4 < D < 16 | D ≥ 16 |
| intra block | $k_1 = 1, k_2 = 1$ strength = 1.5 | $k_1 = 1, k_2 = 0$ strength = 1 | $k_1 = 0, k_2 = 1$ strength = 0.5 |
| inter block | $k_1 = 1, k_2 = 0$ strength = 1 | $k_1 = 1, k_2 = 0$ strength = 1 | $k_1 = 0, k_2 = 1$ strength = 0.5 |

Table Above: Using the following combinations of $k_1$ and $k_2$ it is possible to increase the filtering strength for small intra blocks and decrease it for large inter blocks.

In software, Equation 9 is likely more efficiently implemented using a multiplication $cm_{sum} = (k*m\_sum) \gg 1$, where k=1, 2 or 3, since multiplications are very inexpensive on modern central processing units (CPUs).

The filtered sample $I_F$ is finally computed as $$I_F = I_C + ((cm_{sum} + 4) \gg 3).$$

Combination Results of Loop-Filter

In order not to increase the number of loop-filter stages it is possible to use of result of combined loop-filters. Several loop-filter performs on reconstructed frame in the same time. Result of their processing is difference between input and filtered data. Final result is clipped sum of input data and all of these differences. For example, standard adaptive offset (SAO) and bilateral filter (BIF) [3] provides differences over the input data I(x,y):

$$\Delta_{BIF} = \Delta BIF(I(x,y)),$$

$$\Delta_{SAO} = \Delta SAO(I(x,y)).$$

Final value of pixel in position (x,y) is:

$$R(x,y) = \text{clip}(I(x,y) + \Delta BIF + \Delta SAO).$$

In another embodiment, the LUT is adaptively selected from a predefined set based on information signaled in a bitstream. As described above, the table index is derived based on a QP value (such as block QP). To enable spatial adaptively, each CTU furthermore comprises a corresponding indicator to adjust table index e.g. in a way described below.

In one exemplary implementation, the bitstream contains a CTU level flag to enable or disable the transform domain filter for a current CTU. To optimize the signaling, the bitstream may also comprise an indicator which defines whether per CTU on/off flag signaling is enabled. If per CTU on/off flag is not required (which is decided by encoder's RDO) then default logic for table index derivation is used. If per CTU on/off flag signaling is enabled then it may be an indication that more spatial adaptivity is desired.

In that case if a transform domain filter is enabled for a current CTU, the corresponding index allowing to adjust table selection process is also included into the bitstream. Below is exemplary syntax and semantics according to the embodiment described above.

| | Descriptor |
|---|---|
| { | |
| sps_htdf_enabled_flag | u(1) |
| ... | |
| if( sps_htdf_enabled_flag) | |
| htdf_all_ctu_enabled_flag | u(1) |
| ... | |
| } | |

| | Descriptor |
|---|---|
| coding_tree_unit( ) { | |
| xCtb = ( CtbAddrInRs % PicWidthInCtbsY ) << CtbLog2SizeY | |
| yCtb = ( CtbAddrInRs / PicWidthInCtbsY ) << CtbLog2SizeY | |
| ... | |
| if( slice_htdf_enabled_flag && !htdf_all_ctu_enabled_flag) | |
| htdf( xCtb >> CtbLog2SizeY, yCtb >> CtbLog2SizeY ) | |
| ... | |

| | Descriptor |
|---|---|
| htdf( rx, ry ) { | |
| htdf_ctu_enabled_flag | u(1) |
| if( htdf_block_enabled ) | |
| htdf_ctu_lut_idx | ue(v) |
| } | |
| } | |

The sps_htdf_enabled_flag specifies whether transform domain filter is enabled.

If htdf_all_ctu_enabled_flag is equal to 1 then all CTUs of current slice are filtered with the transform domain filter according to the filter appliance conditions (which can be block size, block prediction type, presence of residual information dependent conduction). If htdf_all_ctu_enabled_flag is equal to 0 the each CTU of the current has corresponding flag to specify whether to apply the transform domain filter to the current CTU.

The htdf_block_enabled_flag specifies whether the transform domain filter is applied for current CTU/coding tree block (CTB) according to filter appliance conditions.

The variable htdf_ctu_lut_idx specifies the index offset for LUT selection from the set used for the transform domain filtering.

The index of an LUT from the set qpIdx is derived as follows:
if variable htdf_all_ctu_enabled_flag is equal to 1:
    if(pred_mode_flag[xCb][yCb]==Intra &&
    nCbW==nCbH && min(nCbW, nCbH)>=32)
        qpIdx=Clip3(0, 4, (Qp-28+(1<<2))>>3)
    else
        qpIdx=Clip3(0, 4, (Qp-20+(1<<2))>>3),
otherwise (e.g. variable htdf_all_ctu_enabled_flag is equal to 0):
    qpIdx=Clip3(0, 4, (lutIdxBase+htdf_ctu_lut_idx−1),
where variable lutIdxBase is derrived as follows:
    lutIdxBase=Clip3(0, 4, (BaseQp-20+(1<<2))>>3),
where BaseQp is slice QP or current block QP. The variable htdf_ctu_lut_idx specifies the index offset for LUT selection from the set used for the transform domain filtering.

The LUT used for filtering of the block is derived by selecting array from setOfLUT based on qpIdx:

LUT=setOfLUT[qpIdx]

setOfLUT[5][16]={0, 0, 2, 6, 10, 14, 19, 23, 28, 32, 36, 41, 45, 49, 53, 57,}, {0, 0, 5, 12, 20, 29, 38, 47, 56, 65, 73, 82, 90, 98, 107, 115,}, {0, 0, 1, 4, 9, 16, 24, 32, 41, 50, 59, 68, 77, 86, 94, 103,}, {0, 0, 3, 9, 19, 32, 47, 64, 81, 99, 117, 135, 154, 179, 205, 230,}, {0, 0, 0, 2, 6, 11, 18, 27, 38, 51, 64, 96, 128, 160, 192, 224,}.

In another exemplary implementation of the present disclosure, the table derivation logic may vary according to one or more conditions (such as the current block conditions, e.g. block size, prediction type etc.). In this implementation the index correction offset is integrated into table index derivation logic.

The index of an LUT from the set qpIdx is derived as follows:
if variable htdf_all_ctu_enabled_flag is equal 0:
    if(pred_mode_flag[xCb][yCb]==Intra &&
    nCbW==nCbH && min(nCbW, nCbH)>=32)
        qpIdx=Clip3(0, 4, (Qp-28+(1<<2))>>3+idxOffset)
    else
        qpIdx=Clip3(0, 4, (Qp-20+(1<<2))>>3+idxOffset),
where idxOffset=htdf_ctu_lut_idx−1.

The variable htdf_ctu_lut_idx specifies the index offset for LUT selection from the set used for the transform domain filtering.

Figure 19:
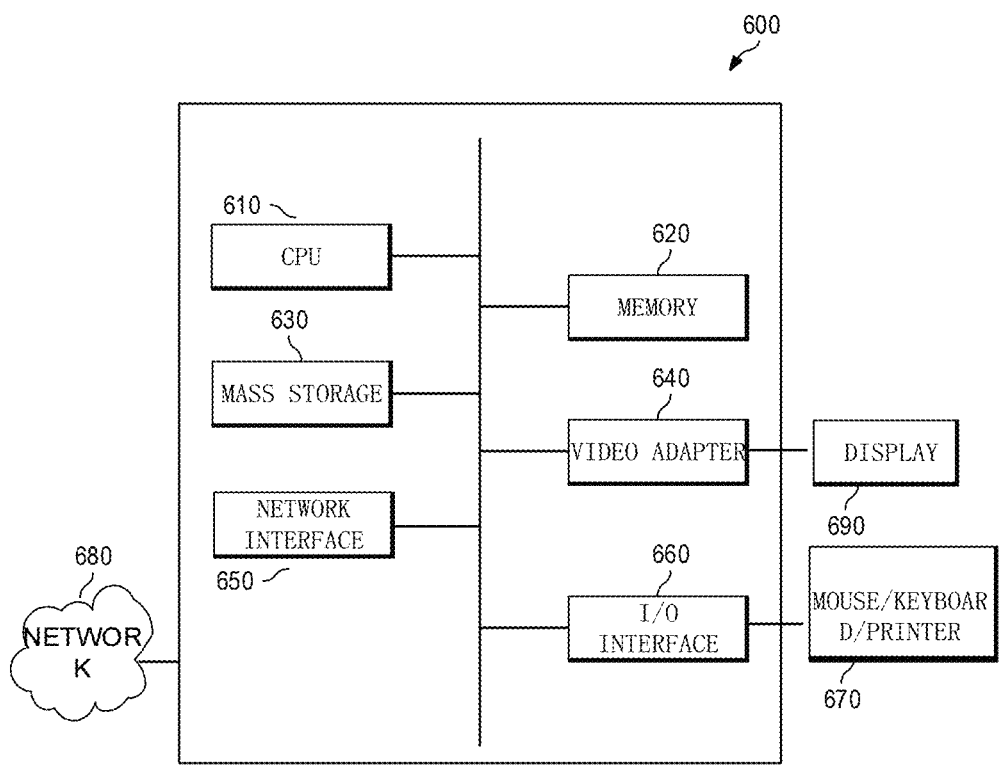
FIG. 19 is a schematic diagram illustrating an exemplary structure of an apparatus according to an embodiment.

FIG. 19 is a block diagram of an apparatus 600 that can be used to implement various embodiments. The apparatus 600 may be the encoding apparatus as shown in FIG. 1 and the decoding apparatus as shown in FIG. 2. Additionally, the apparatus 600 can host one or more of the described elements. In some embodiments, the apparatus 600 is equipped with one or more input/output devices, such as a speaker, microphone, mouse, touchscreen, keypad, keyboard, printer, display, and the like. The apparatus 600 may include one or more CPUs 610, a memory 620, a mass storage 630, a video adapter 640, and an input/output (I/O) interface 660 connected to a bus. The bus is one or more of any type of several bus architectures including a memory bus or memory controller, a peripheral bus, a video bus, or the like.

The CPU 610 may have any type of electronic data processor. The memory 620 may have, or be, any type of system memory such as SRAM, dynamic random-access memory (DRAM), synchronous DRAM (SDRAM), read-only memory (ROM), a combination thereof, or the like. In an embodiment, the memory 620 may include ROM for use at boot-up, and DRAM for program and data storage for use while executing programs. In embodiments, the memory 620 is non-transitory. The mass storage 630 includes any type of storage device that stores data, programs, and other information and to make the data, programs, and other information accessible via the bus. The mass storage 630 includes, for example, one or more of a solid state drive, hard disk drive, a magnetic disk drive, an optical disk drive, or the like.

The video adapter 640 and the I/O interface 660 provide interfaces to couple external input and output devices to the apparatus 600. For example, the apparatus 600 may provide Structured Query Language (SQL) command interface to clients. As illustrated, examples of input and output devices include a display 690 coupled to the video adapter 640 and any combination of mouse/keyboard/printer 670 coupled to the I/O interface 660. Other devices may be coupled to the apparatus 600, and additional or fewer interface cards may be utilized. For example, a serial interface card (not shown) may be used to provide a serial interface for a printer.

The apparatus 600 also includes one or more network interfaces 650, which includes wired links, such as an Ethernet cable or the like, and/or wireless links to access nodes or one or more networks 680. The network interface 650 allows the apparatus 600 to communicate with remote units via the networks 680. For example, the network interface 650 may provide communication to database. In an embodiment, the apparatus 600 is coupled to a local-area network or a wide-area network for data processing and communications with remote devices, such as other processing units, the Internet, remote storage facilities, or the like.

Proposed design of in-loop filter or prediction filter has the following advantages in respect to conventional adaptive filtering methods such as ALF:

- The proposed frequency domain filter derives filtering parameters (frequency domain gain coefficients) from reconstructed frame or predicted block on the decoder side and so filtering parameters is not required to be transferred from encoder to decoder side.
- ALF requires complex RDO on the encoder side for decreasing number of weighted coefficients for transmission. Proposed method does not require complex RDO on the encoder side (no parameters transferring) and applied for all blocks which satisfy the predefined conditions
- ALF is linear filter in pixel domain. The proposed filter is non-linear because gain coefficient for each 1D spectrum component depends on this spectrum component value. It allows to achieve additional coding gain from non-linear processing.
- ALF requires universal multipliers on the decoder side. In proposed method filtering can be implemented as an LUT, because gain for each spectrum coefficient is less one. Therefore the proposed method can be implemented without any multiplication.

Thus, the filter is provided allowing improving the efficiency for video coding with low complexity.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

Following is an explanation of the applications of the encoding method as well as the decoding method as shown in the above-mentioned embodiments, and a system using them.

Figure 20:
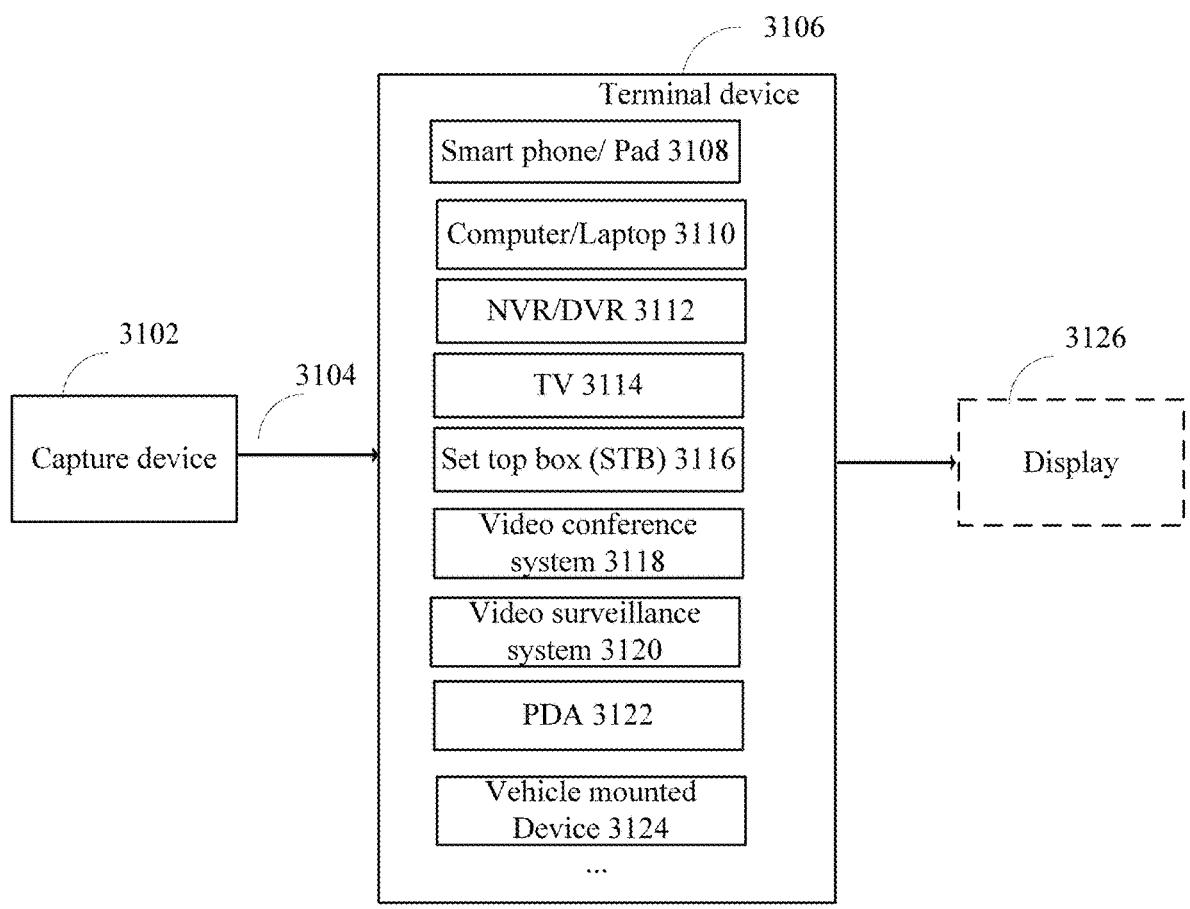
FIG. 20 is a block diagram showing an example structure of a content supply system 3100 which realizes a content delivery service.

FIG. 20 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WI-FI, Ethernet, cable, wireless (3rd generation (3G)/4th generation (4G)/5th generation (5G)), Universal Serial Bus (USB), or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or pad, computer or laptop, video conference system, personal digital assistant (PDA), vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, television (TV) 3114, set top box (STB) 3116, video conference system 3118, video surveillance system 3120, PDA 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, NVR/DVR 3112, TV 3114, PDA 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 21:
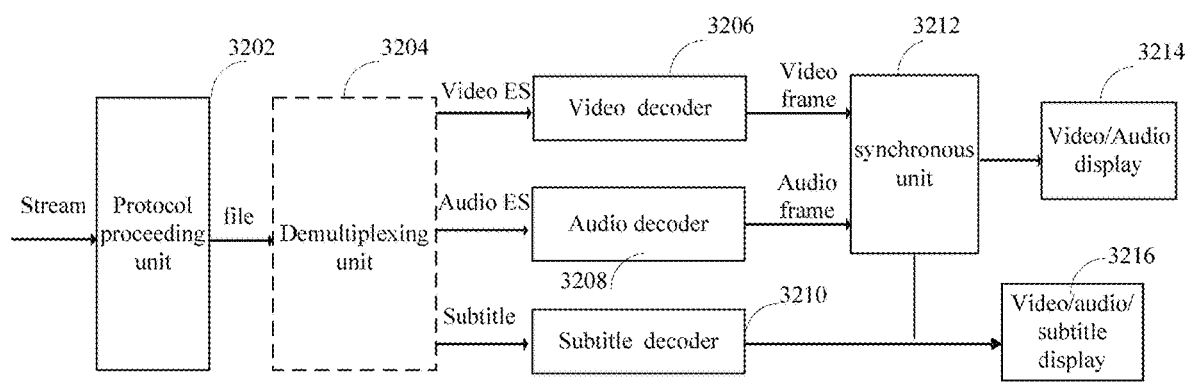
FIG. 21 is a block diagram showing a structure of an example of a terminal device.

FIG. 21 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real-Time Streaming Protocol (RTSP), Hyper Text Transfer Protocol (HTTP), HTTP live streaming protocol (HLS), MPEG-Dynamic Adaptive Streaming over HTTP (DASH), Real-Time Transport protocol (RTP), Real-Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Further embodiments of the present disclosure are provided in the following. It should be noted that the numbering used in the following section does not necessarily need to comply with the numbering used in the previous sections.

Embodiment 1. A method for processing a reconstructed block, wherein the reconstructed block comprises a plurality of pixels, wherein the method comprises scanning a current pixel of the reconstructed block and its neighboring pixels of the current pixel according to a predefined scan template, obtaining spectrum components by performing transform for the current pixel and its neighboring pixels, obtaining filtered spectrum components based on a filtering parameter and the spectrum components, obtaining filtered pixels based on filtered spectrum components, and generating a filtered reconstructed block based on the filtered pixels.

Embodiment 2. The method according to embodiment 1, wherein the obtaining the filtered spectrum components by using a LUT and the LUT is obtained based on an information signaled in a bitstream.

Embodiment 2a The method according to embodiment 2, further comprises a set of LUTs and wherein LUT is selected from the set based on information signaled in the bitstream.

Embodiment 2b The method according to embodiment 2a, further comprises a logic to obtain an index to select a LUT from the set based on a QP value, wherein the QP value obtained base on the block QP value or slice (group of tiles) QP value.

Embodiment 2c The method according to embodiment 2b, wherein the index of LUT is selected based on at least one of the following conditions:
QP value of the block;
QP value of the slice;
the block has non-zero residual signal;
a size of the block;
an aspect ratio of the block;
a prediction mode of the block;
a prediction mode of the block is intra; or
a prediction mode of the block is inter.

Embodiment 2d The method according to any one of embodiments 2-2c, where index of LUT is further modified based on corresponding information signaled in bitstream.

Embodiment 3. The method according to embodiment 2, wherein a filtered spectrum component $F(i, \sigma)$ is derived by:

$$F(i, \sigma) = \begin{cases} R(i), & \text{Abs}(R(i)) \geq THR \\ LUT(R(i), \sigma), & R(i) > 0 \\ -LUT(-R(i), \sigma), & R(i) \leq 0 \end{cases}$$

wherein (i) is an index of a spectrum component, $R(i)$ is the spectrum component corresponding to (i) index, $\sigma$ is the filtering parameter, $LUT(R(i), \sigma)$ is an array in the LUT, and THR is a threshold.

Embodiment 4. The method according to embodiment 3, wherein $$LUT(R(i), \sigma) = \frac{R(i)^3}{R(i)^2 + m*\sigma^2},$$

m is normalization constant equal to number of spectrum components.

Embodiment 5. The method according to any one of embodiments 2-4, wherein the filtering parameter is derived based on a codec QP.

Embodiment 6. The method according to embodiment 5, wherein the filtering parameter σ is derived by $\sigma = k*2^{(n*(QP-s))}$, wherein QP is the codec QP, k, n and s are constants.

Embodiment 7. The method according to embodiment 6, wherein k=2.64, n=0.1296 and s=11.

Embodiment 8. The method according to embodiment 6 or 7, wherein k is modified based on bit depth of pixels $k_{mod}$=k*(1<<(bit_depth−8)).

Embodiment 9. The method according to embodiment 5, wherein the filtering parameter σ is equal to zero if QP<=17, and the reconstructed block is bypassed without filtering.

Embodiment 10. The method according to any one of embodiments 2-9, THR is dependent of QP value.

Embodiment 11. The method according to embodiment 10, THR is derived by:

$$\frac{THR^2}{THR^2 + m*\sigma^2} = C.$$

Wherein C is a value close to 1.

Embodiment 12. The method according to any one of embodiments 1-11, wherein the predefined scan template is defined as set of spatial or raster offsets relative to a position of the current pixel inside the reconstructed block.

Embodiment 13. The method according to embodiment 12, wherein the predefined scan template is defined as follows scanTmpl[4] (y, ={(0,0), (0,1), (1,0), (1,1)}

Embodiment 14. The method according to embodiment 12, wherein when the predefined scan template is defined as set of raster offsets relative to the position of the current pixel inside the reconstructed block, offsets point to neighbor pixels are inside the reconstructed block.

Embodiment 15. The method according to any one of embodiments 1-14, wherein at least one filtered pixel is placed to its original position according to the predefined scan template.

Embodiment 16. The method according to any one of embodiments 1-15, wherein all filtered pixels are added to an accumulation buffer according to the predefined scan template, and wherein the accumulation buffer is initialized by zero before the obtaining filtered spectrum components.

Embodiment 17. The method according to embodiment 16, wherein final filtered pixels are obtained as accumulated values in the accumulation buffer divided by number of pixels adding to a current position of the accumulation buffer, and wherein the generating the filtered reconstructed block based on the filtered pixels comprises generating the filtered reconstructed block based on the final filtered pixels.

Embodiment 18. The method according to any one of embodiments 1-17, wherein differences between all filtered and corresponding unfiltered pixels are added to an accumulation buffer according to the predefined scan template, and wherein the accumulation buffer is initialized by unfiltered pixels multiplied by maximum number of pixel values to be added in the block.

Embodiment 19. The method according to embodiment 18, wherein final filtered pixels are obtained as accumulated values in the accumulation buffer divided by maximum number of pixel values to be added in the block.

Embodiment 20a. The method according to any one of embodiments 1-19, wherein the method is applied depending on conditions, wherein the conditions comprises at least one of:

the block has non-zero residual signal;
a size of the block;
an aspect ratio of the block;
a prediction mode of the block;
a prediction mode of the block in intra; or
a prediction mode of the block in inter.

Embodiment 21. The method according to embodiment 20, wherein the filter parameter and/or the predefined scan template are depending on the conditions.

Embodiment 22. The method according to embodiment 20, where the method is applied if size of the block obtained as block width multiplied by block height is greater than 4×4.

Embodiment 23. The method according to embodiment 20, where the method is not applied if the prediction mode of the block is inter and the block width and the block height is greater or equal to 32.

Embodiment 24. The method according to embodiment 20, where the method is applied if the prediction mode of the block is inter and the block has non-zero residual signal.

Embodiment 25. The method according to embodiment 20, where the method is applied if the prediction mode of the block is intra.

Embodiment 25b. The method according to any one of embodiments 1-19, wherein the method is applied when a flag is true.

Embodiment 26. The method according to any one of embodiments 1-25, wherein scanning the current pixel of the reconstructed block and its neighboring pixels of the current pixel according to the predefined scan template to an accumulation buffer, and obtaining spectrum components by performing transform for pixels in the accumulation buffer.

Embodiment 27. The method according to any one of embodiments 1-26, wherein the transform is a Hadamard transform.

Embodiment 28. The method according to any one of embodiments 1-27, wherein the transform is a 1D transform.

Embodiment 29. A method for processing a predicted block, wherein the predicted block comprises a plurality of pixels, wherein the method comprises scanning a current pixel of the predicted block and its neighboring pixels of the current pixel according to a predefined scan template, obtaining spectrum components by performing transform for the current pixel and its neighboring pixels, obtaining filtered spectrum components based on a filtering parameter and the spectrum components, obtaining filtered pixels by performing inverse transform for the filtered spectrum components, and generating a filtered predicted block based on the filtered pixels.

Embodiment 30. The method according to embodiment 29, wherein the obtaining the filtered spectrum components by using a LUT.

Embodiment 31. The method according to embodiment 30, a filtered spectrum component F(i, σ) is derived by:

$$F(i, \sigma) = \begin{cases} R(i), & \text{Abs}(R(i)) \geq THR \\ LUT(R(i), \sigma), & R(i) > 0 \\ -LUT(-R(i), \sigma), & R(i) \leq 0 \end{cases}$$

wherein (i) is an index of a spectrum component, R(i) is the spectrum component corresponding to (i) index, σ is the filtering parameter, LUT(R(i), σ) is an array in the LUT, and THR is a threshold.

Embodiment 32. The method according to embodiment 31, wherein $$LUT(R(i), \sigma) = \frac{R(i)^3}{R(i)^2 + m * \sigma^2},$$

m is normalization constant equal to number of spectrum components.

Embodiment 33. The method according to any one of embodiments 30-32, wherein the filtering parameter is derived based on a codec QP.

Embodiment 34. The method according to embodiment 33, wherein the filtering parameter σ is derived by $$\sigma = k * 2^{(n*(QP-s))},$$

wherein QP is the codec QP, k, n and s are constants.

Embodiment 35. The method according to embodiment 33, wherein the filtering parameter σ is equal to zero if QP<=17, and the predicted block is bypassed without filtering.

Embodiment 36. The method according to any one of embodiments 31-35, THR is dependent of QP value.

Embodiment 37. The method according to embodiment 36, THR is derived by:

$$\frac{THR^2}{THR^2 + m * \sigma^2} = C.$$

Wherein C is a value close to 1.

Embodiment 38. The method according to any one of embodiments 29-37, wherein the predefined scan template is defined as set of spatial or raster offsets relative to a position of the current pixel inside the predicted block.

Embodiment 39. The method according to embodiment 38, wherein the predefined scan template is defined as follows scanTmpl[4] (y, ={(0,0), (0,1), (1,0), (1,1)}.

Embodiment 40. The method according to any one of embodiments 29-39, wherein at least one filtered pixel is placed to its original position according to the predefined scan template.

Embodiment 41. The method according to any one of embodiments 29-40, wherein all filtered pixels are added to an accumulation buffer according to the predefined scan template, and wherein the accumulation buffer is initialized by zero before the obtaining filtered spectrum components.

Embodiment 42. The method according to embodiment 41, wherein final filtered pixels are obtained as accumulated values in the accumulation buffer divided by number of pixels adding to a current position of the accumulation buffer, and wherein the generating the filtered predicted block based on the filtered pixels comprises generating the filtered predicted block based on the final filtered pixels.

Embodiment 43. The method according to any one of embodiments 29-42, wherein the method is applied depending on conditions, wherein the conditions comprises at least one of:
the block has non-zero residual signal;
a size of the block;
an aspect ratio of the block;
a prediction mode of the block;
a prediction mode of the block in intra; or
a prediction mode of the block in inter.

Embodiment 44. The method according to embodiment 43, wherein the filter parameter and/or the predefined scan template are depending on the conditions.

Embodiment 45. The method according to embodiment 43, where the method is applied if size of the block obtained as block width multiplied by block height is greater than 4×4, or if the prediction mode of the block is intra, or if the prediction mode of the block is inter and the block has non-zero residual signal.

Embodiment 46. The method according to any one of embodiments 29-45, wherein the transform is a Hadamard transform.

Embodiment 47. A method of encoding implemented by an encoding device, comprising determining a syntax element (such as htdf_all_ctu_enabled_flag) indicating whether the method according to any one of embodiments 1-46 is performed or not, and generating a bitstream including the syntax element.

Embodiment 48. A method of coding implemented by a decoding device, comprising parsing from a bitstream a syntax element indicating whether the method according to any one of embodiments 1-46 is performed or not, and adaptively enabling or disabling a transform domain filtering of the current block according to the syntax element indicating whether the method according to any one of embodiments 1-46 is performed or not.

Mathematical Operators.

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic operators.

The following arithmetic operators are defined as follows:
+ Addition
− Subtraction (as a two-argument operator) or negation (as a unary prefix operator)
* Multiplication, including matrix multiplication Exponentiation. Specifies x to the power of y. In other contexts, such notation
$x^y$ is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x Used to denote division in mathematical equations where no truncation or
$\overline{y}$ rounding is intended.

$$\sum_{i=x}^{y} f(i)$$

The summation of f(i) with i taking all integer values from x up to and including y.

x % y Modulus. Remainder of x divided by y, defined only for integers x and y with x>=0 and y>0.

Logical Operators.

The following logical operators are defined as follows:

x && y Boolean logical "and" of x and y x||y Boolean logical "or" of x and y

! Boolean logical "not"

x?y:z If x is TRUE or not equal to 0, evaluates to the value of y, otherwise, evaluates to the value of z.

Relational Operators.

The following relational operators are defined as follows:

> Greater than

>= Greater than or equal to

< Less than

<= Less than or equal to

== Equal to

!= Not equal to.

When a relational operator is applied to a syntax element or variable that has been assigned the value "na" (not applicable), the value "na" is treated as a distinct value for the syntax element or variable. The value "na" is considered not to be equal to any other value.

Bit-Wise Operators.

The following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits as a result of the left shift have a value equal to 0.

Assignment Operators.

The following arithmetic operators are defined as follows:

= Assignment operator

++ Increment, i.e., x++ is equivalent to x=x+1, when used in an array index, evaluates to the value of the variable prior to the increment operation.

-- Decrement, i.e., x-- is equivalent to x=x-1, when used in an array index, evaluates to the value of the variable prior to the decrement operation.

+= Increment by amount specified, i.e., x+=3 is equivalent to x=x+3, and x+=(-3) is equivalent to x=x+(-3).

-= Decrement by amount specified, i.e., x-=3 is equivalent to x=x-3, and x-=(-3) is equivalent to x=x-(-3).

Range Notation.

The following notation is used to specify a range of values:

x=y . . . z x takes on integer values starting from y to z, inclusive, with x, y, and z being integer numbers and z being greater than y.

Mathematical Functions.

The following mathematical functions are defined:

$$\mathrm{Abs}(x) = \begin{cases} x; & x >= 0 \\ -x; & x < 0 \end{cases}$$

A sin(x) the trigonometric inverse sine function, operating on an argument x that is in the range of −1.0 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$\mathrm{Atan2}(y, x) = \begin{cases} \mathrm{Atan}\left(\frac{y}{x}\right); & x > 0 \\ \mathrm{Atan}\left(\frac{y}{x}\right) + \pi; & x < 0 \ \&\& \ y >= 0 \\ \mathrm{Atan}\left(\frac{y}{x}\right) - \pi; & x < 0 \ \&\& \ y < 0 \\ +\frac{\pi}{2}; & x == 0 \ \&\& \ y >= 0 \\ -\frac{\pi}{2}; & \text{otherwise} \end{cases}$$

Ceil (x) the smallest integer greater than or equal to x.

$$Clip1_Y(x) = Clip3(0, (1 \ll BitDepth_Y) - 1, x)$$

$$Clip1_C(x) = Clip3(0, (1 \ll BitDepth_C) - 1, x)$$

$$Clip3(x, y, z) = \begin{cases} x; & z < x \\ y; & z > y \\ z; & \text{otherwise} \end{cases}$$

Cos (x) the trigonometric cosine function operating on an argument x in units of radians.

Floor(x) the largest integer less than or equal to x.

$$GetCurrMsb(a, b, c, d) = \begin{cases} c + d; & b - a >= d/2 \\ c - d; & a - b > d/2 \\ c; & \text{otherwise} \end{cases}$$

Ln (x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$\mathrm{Min}(x, y) = \begin{cases} x; & x <= y \\ y; & x > y \end{cases}$$

-continued $$Max(x, y) = \begin{cases} x; & x >= y \\ y; & x < y \end{cases}$$

Round $(x)$ = Sign $(x)$ * Floor (Abs$(x)$ + 0.5)

$$Sign (x) = \begin{cases} 1; & x > 0 \\ 0; & x == 0 \\ -1; & x < 0 \end{cases}$$

Sin (x) the trigonometric sine function operating on an argument x in units of radians Sqrt(x)=$\sqrt{x}$ Swap (x, y)=(y, x)

Tan (x) the trigonometric tangent function operating on an argument x in units of radians.

Order of Operation Precedence.

When an order of precedence in an expression is not indicated explicitly by use of parentheses, the following rules apply. Operations of a higher precedence are evaluated before any operation of a lower precedence. Operations of the same precedence are evaluated sequentially from left to right.

The table below specifies the precedence of operations from highest to lowest, a higher position in the table indicates a higher precedence.

For those operators that are also used in the C programming language, the order of precedence used in this Specification is the same as used in the C programming language.

Operation precedence from highest (at top of table) to lowest (at bottom of table):

| operations (with operands x, y, and z) |
| --- |
| "x++" , "x− −" |
| "!x", "−x" (as a unary prefix operator) |
| $x^y$ |
| "$x * y$", "$x/y$", "$x \div y$", "$\frac{x}{y}$", "$x \% y$" |
| "x + y", "x − y" (as a two-argument operator), |
| "$\sum_{i=x}^{y} f(i)$" |
| "x << y", "x >> y" |
| "x < y", "x <= y", "x > y", "x >= y" |
| "x = = y", "x != y" |
| "x & y" |
| "x \| y" |
| "x && y" |
| "x \|\| y" |
| "x ? y : z" |
| "x . . . y" |
| "x = y", x += y", "x −= y" |

Text Description of Logical Operations.

In the text, a statement of logical operations as would be described mathematically in the following form:

if(condition 0)
  statement 0
else if(condition 1)
  statement 1
. . .
else /* informative remark on remaining condition */
  statement n may be described in the following manner:
  . . . as follows/. . . the following applies:
  If condition 0, statement 0
  Otherwise, if condition 1, statement 1
  . . .
  Otherwise (informative remark on remaining condition), statement n Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

if(condition 0a && condition 0b)
  statement 0
else if(condition 1a|| condition 1b)
  statement 1
. . .
else
  statement n may be described in the following manner:
  . . . as follows/. . . the following applies:
  If all of the following conditions are true, statement 0:
    condition 0a
    condition 0b
  Otherwise, if one or more of the following conditions are true, statement 1:
    condition 1a
    condition 1b
  . . .
  Otherwise, statement n In the text, a statement of logical operations as would be described mathematically in the following form:

if(condition 0)
  statement 0
if(condition 1)
  statement 1 may be described in the following manner:
  When condition 0, statement 0
  When condition 1, statement 1

Although embodiments of the disclosure have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, electrically erasable programmable ROM (EEPROM), compact disc-ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. An encoding device, comprising:
a processor; and
a memory coupled to the processor and configured to store instructions that, when executed by the processor, cause the encoding device to be configured to:
determine whether a transform domain filter is enabled according to one or more conditions;
generate a bitstream including a syntax element that indicates whether the transform domain filter is enabled; and
derive a table index of a look-up table (LUT) by clipping a first operation on an adjusted index when the transform domain filter is disabled, wherein the adjusted index is based on a base index and an index offset.

2. The encoding device of claim 1, wherein the syntax element is based on at least one of a sequence parameter set (SPS) level, a picture parameter set (PPS) level, a slice header, coding tree unit (CTU) syntax, or coding unit (CU) syntax.

3. The encoding device of claim 1, wherein the bitstream further includes information for adjusting a table selection process of the transform domain filter for a current block or includes the index offset.

4. The encoding device of claim 3, wherein an adjusted table index is based on a derived base index and the index offset.

5. The encoding device of claim 4, wherein the adjusted table index is based on the derived base index and the index offset when the syntax element indicates the transform domain filter is disabled.

6. The encoding device of claim 4, wherein the adjusted table index indicates a first LUT from a set of LUTs or the adjusted table index determines, from the set of LUTs, a second LUT used for the transform domain filter of the current block.

7. The encoding device of claim 3, wherein the index offset indicates a first LUT from a set of LUTs or the index offset determines, from the set of LUTs, a second LUT used for the transform domain filter of the current block.

8. The encoding device of claim 1, wherein when the transform domain filter is enabled, the instructions further cause the encoding device to be configured to:
derive a second table index by clipping a second operation on a first shifted quantization parameter (QP) value when the one or more conditions are met, wherein the first shifted QP value is based on a block QP value or a slice QP value, otherwise; and
derive the second table index by clipping a third operation on a second shifted QP value when the one or more conditions are not met, wherein the second shifted QP value is based on the block QP value or the slice QP value.

9. The encoding device of claim 1, wherein the instructions further cause the encoding device to be configured to derive the base index by clipping a second operation on a first shifted quantization parameter (QP) value or a second shifted QP value, and wherein the first shifted QP value or the second shifted QP value is based on a block QP value or a slice QP value.

10. The encoding device of claim 1, wherein when the transform domain filter is disabled, the instructions further cause the encoding device to be configured to:

derive the table index of the LUT by clipping the first operation on the adjusted index when the one or more conditions are met, wherein the adjusted index is based on a first shifted quantization parameter (QP) value and the index offset, and wherein the first shifted QP value is based on a block QP value or a slice QP value; and derive the table index of the LUT by clipping a second operation on the adjusted index when the one or more conditions are not met, wherein the adjusted index is based on a second shifted QP value and the index offset, and wherein the second shifted QP value is based on the block QP value or the slice QP value.

11. A decoding device, comprising:
a processor; and
a memory coupled to the processor and configured to store instructions that, when executed by the processor, cause the decoding device to be configured to:
parse a syntax element of a bitstream to determine whether a transform domain filter is enabled according to one or more conditions, wherein the syntax element indicates whether the transform domain filter is enabled;
enable the transform domain filter for a current block when the transform domain filter is enabled;
disable the transform domain filter for the current block when the transform domain filter is disabled; and
derive a table index of a look-up-table (LUT) by clipping a first operation on an adjusted index when the transform domain filter is disabled, wherein the adjusted index is based on a base index and an index offset.

12. The decoding device of claim 11, wherein the syntax element is from any one of a sequence parameter set (SPS) level of the bitstream, a picture parameter set (PPS) level of the bitstream, a slice header, coding tree unit (CTU) syntax, or coding unit (CU) syntax.

13. The decoding device of claim 11, wherein the instructions further cause the decoding device to be configured to parse the bitstream for information for adjusting a table selection process of the transform domain filter for the current block or parse the bitstream for the index offset.

14. The decoding device of claim 13, wherein an adjusted table index is based on a derived base index and the index offset.

15. The decoding device of claim 14, wherein the adjusted table index is based on the derived base index and the index offset when the syntax element indicates the transform domain filter is disabled.

16. The decoding device of claim 14, wherein the adjusted table index indicates a first LUT from a set of LUTs, or the adjusted table index determines, from the set of LUTs, a second LUT used for the transform domain filter of the current block.

17. The decoding device of claim 13, wherein the index offset indicates a first LUT from a set of LUTs or the index offset determines, from the set of LUTs, a second LUT used for the transform domain filter of the current block.

18. The decoding device of claim 11, wherein when the syntax element indicates the transform domain filter is enabled or the syntax element is a second value, the instructions further cause the decoding device to be configured to:

derive a second table index by clipping a second operation on a first shifted quantization parameter (QP) value when the one or more conditions are met, wherein the first shifted QP value is based on a block QP value or a slice QP value; and derive the second table index by clipping a third operation on a second shifted QP value when the one or more conditions are not met, wherein the second shifted QP value is based on the block QP value or the slice QP value.

19. The decoding device of claim 11, wherein the instructions further cause the decoding device to be configured to derive the base index by clipping a second operation on a first shifted quantization parameter (QP) value or a second shifted QP value, and wherein the first shifted QP value or the second shifted QP value is based on a block QP value or a slice QP value.

20. The decoding device of claim 11, wherein when the transform domain filter is enabled or the syntax element is a first value, the instructions further cause the decoding device to be configured to:
derive the table index of the LUT by clipping the first operation on the adjusted index when the one or more conditions are met, wherein the adjusted index is based on a first shifted quantization parameter (QP) value and the index offset, and wherein the first shifted QP value is based on a block QP value or a slice QP value; and
derive the table index of the LUT by clipping a second operation on the adjusted index when the one or more conditions are not met, wherein the adjusted index is based on a second shifted QP value and the index offset, and wherein the second shifted QP value is based on the block QP value or the slice QP value.

21. A computer program product comprising instructions that are stored on a non-transitory computer-readable medium and that, when executed by a processor, cause an apparatus to:
parse a syntax element from a bitstream to determine whether a transform domain filter is enabled, wherein the syntax element indicates whether the transform domain filter is enabled;
enable the transform domain filter for a current block when the transform domain filter is enabled;
disable the transform domain filter for the current block when the transform domain filter is disabled; and
derive a table index of a look-up-table (LUT) by clipping a first operation on an adjusted index when the transform domain filter is disabled, wherein the adjusted index is based on a base index and an index offset.

22. The computer program product of claim 21, wherein the syntax element is from any one of a sequence parameter set (SPS) level of the bitstream, a picture parameter set (PPS) level of the bitstream, a slice header, coding tree unit (CTU) syntax, or coding unit (CU) syntax.

23. The computer program product of claim 21, wherein the instructions that when executed by the processor further cause the apparatus to parse the bitstream for information for adjusting a table selection process of the transform domain filter for the current block or parse the bitstream for the index offset.

* * * * *